United States Patent
Okajima et al.

(10) Patent No.: US 6,760,588 B2
(45) Date of Patent: Jul. 6, 2004

(54) METHOD AND APPARATUS FOR STABILIZING COMMUNICATION IN MOBILE COMMUNICATION SYSTEM

(75) Inventors: Ichiro Okajima, Yokohama (JP);
Narumi Umeda, Yokohama (JP);
Yoshifumi Suzuki, Yokosuka (JP);
Yasushi Yamao, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 588 days.

(21) Appl. No.: 09/748,260

(22) Filed: Dec. 27, 2000

(65) Prior Publication Data

US 2001/0018346 A1 Aug. 30, 2001

(30) Foreign Application Priority Data

Dec. 28, 1999 (JP) ............................................ 11-375795

(51) Int. Cl.⁷ ................................................. H04Q 7/20
(52) U.S. Cl. .................... 455/437; 455/442; 455/67.11; 455/226.2; 370/338; 370/349; 370/394
(58) Field of Search ................................ 455/463, 437, 455/438, 439, 442, 449, 426.1, 226.1, 226.2, 226.3, 67.11; 370/331, 332, 338, 349, 394, 352, 353, 354, 355, 356

(56) References Cited

U.S. PATENT DOCUMENTS 5,570,367 A * 10/1996 Ayanoglu et al. ............ 370/346
5,872,777 A * 2/1999 Brailean et al. ............. 370/349
5,950,135 A 9/1999 Cullen
5,974,035 A * 10/1999 Norp ......................... 370/331
6,108,547 A 8/2000 Yamashita et al.

FOREIGN PATENT DOCUMENTS

| EP | 0 522 773 | 1/1993 |
| GB | 2 319 439 | 5/1998 |
| JP | 10-145834 | 5/1998 |
| WO | WO 00/70782 | 11/2000 |

* cited by examiner

Primary Examiner—Erika Gary
Assistant Examiner—Temica M. Davis
(74) Attorney, Agent, or Firm—Oblon, Spivak, McClelland, Maier & Neustadt, P.C.

(57) ABSTRACT

A mobile communication system includes a plurality of base stations in a communication service area connected to a packet communications network. A mobile station communicates with a second station through the plurality of base stations and the network. The mobile communication system determines a virtual base station group as an aggregation of the plurality of base stations communicating with the mobile station, based on a condition of a radio transmission path between the mobile station and each base station, and combines information received by the plurality of base stations that belong to the virtual base station group at a base station included in the virtual base station group. The network connects the plurality of base stations non-hierarchically and the base station transmits combined information to the second station through the network relative to combined packets having the second station as a destination.

11 Claims, 34 Drawing Sheets

FIG.1
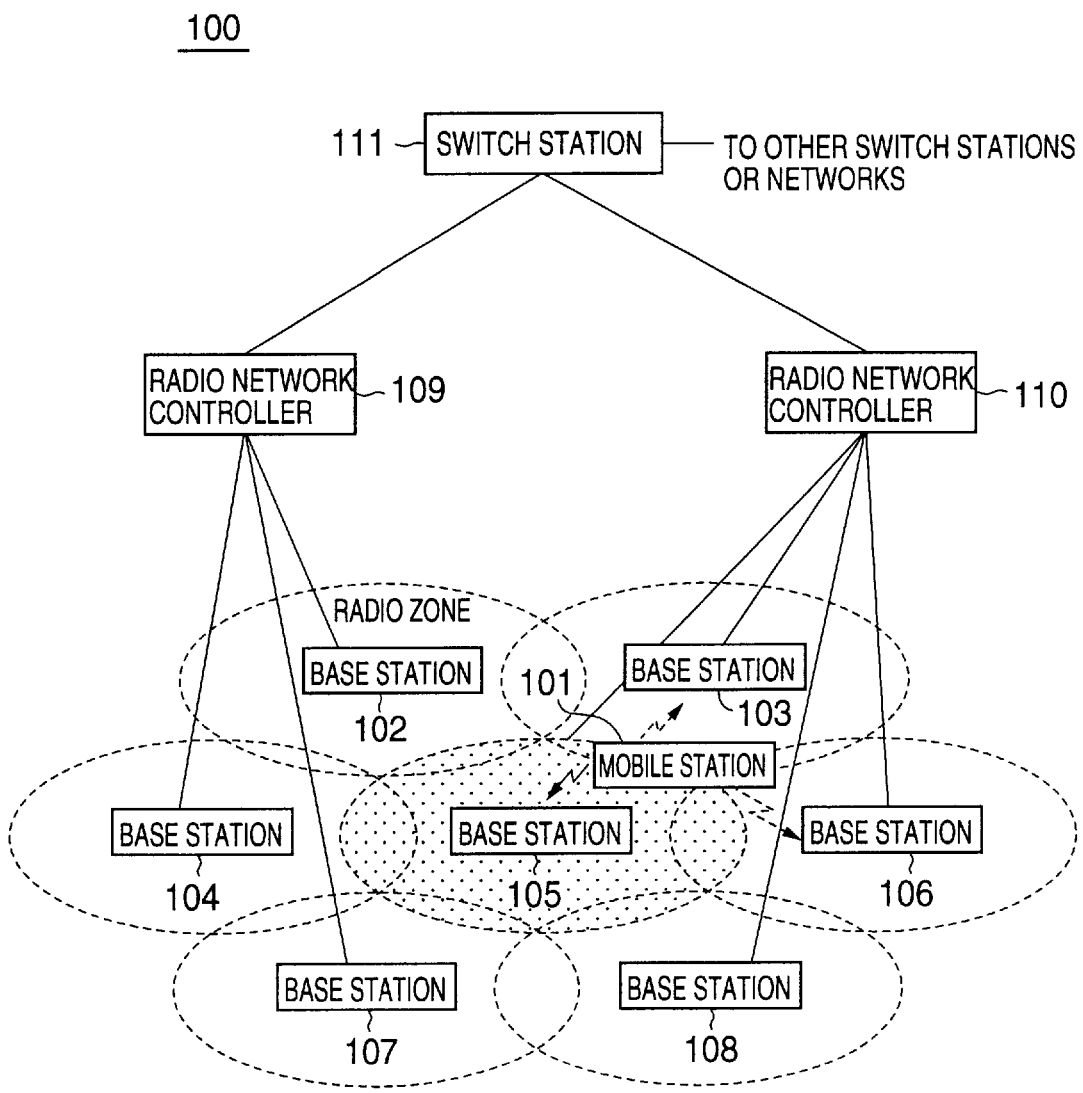
 RADIO ZONE OF BASE STATION COMMUNICATING WITH MOBILE STATION
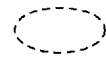 RADIO ZONE OF OTHER BASE STATIONS
 SIGNAL TRANSMITTED BY MOBILE STATION, BUT NOT RECEIVED BY BASE STATION

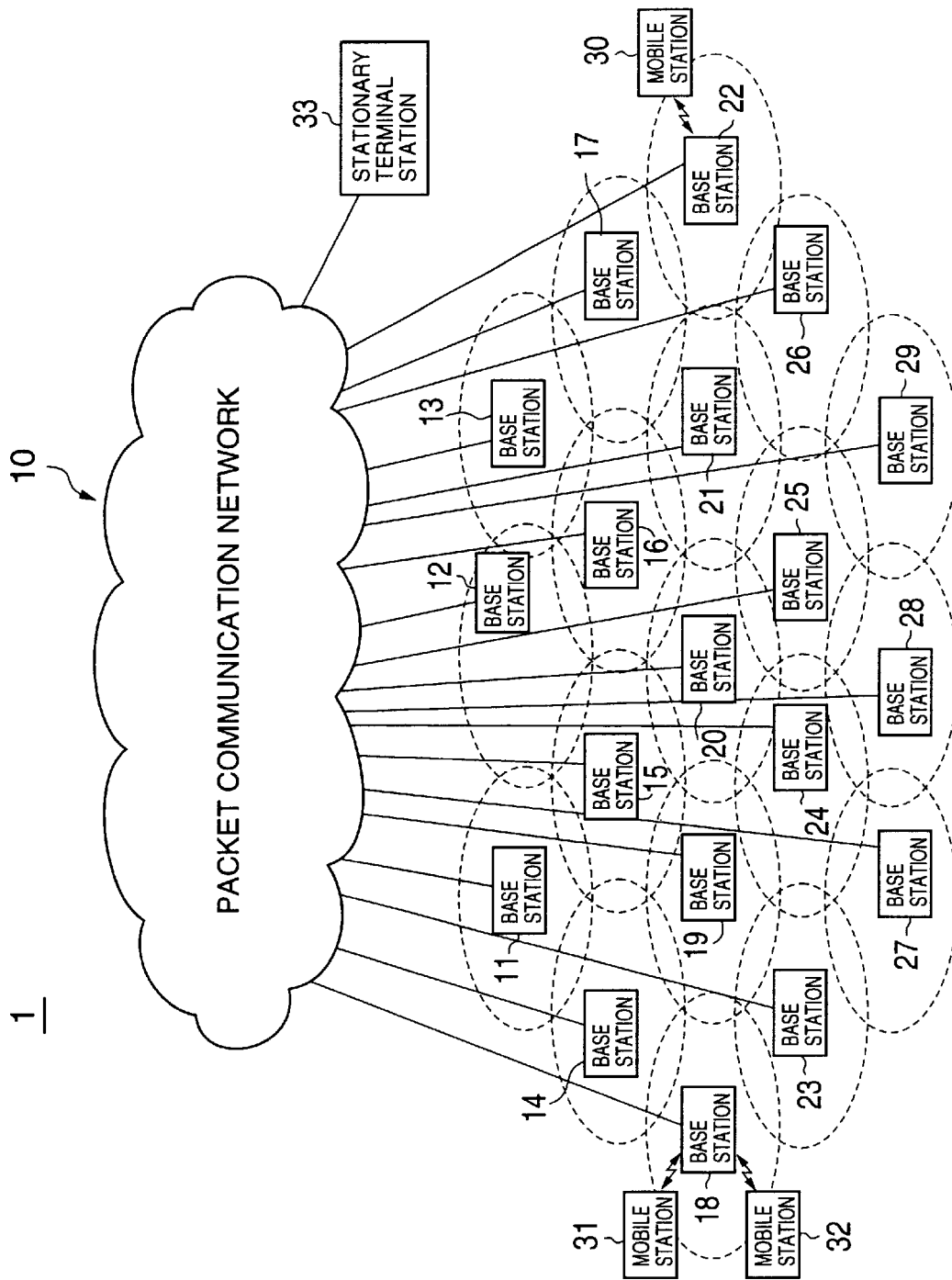

FIG.4

| COMMUNICATION NODE | IP ADDRESS | |
|---|---|---|
| BASE STATION 11 | IP ADDRESS 1 | CH 7 |
| BASE STATION 12 | IP ADDRESS 2 | CH 3 |
| BASE STATION 13 | IP ADDRESS 3 | CH 4 |
| BASE STATION 14 | IP ADDRESS 4 | CH 1 |
| BASE STATION 15 | IP ADDRESS 5 | CH 2 |
| BASE STATION 16 | IP ADDRESS 6 | CH 6 |
| BASE STATION 17 | IP ADDRESS 7 | CH 7 |
| BASE STATION 18 | IP ADDRESS 8 | CH 3 |
| BASE STATION 19 | IP ADDRESS 9 | CH 4 |
| BASE STATION 20 | IP ADDRESS 10 | CH 5 |
| BASE STATION 21 | IP ADDRESS 11 | CH 1 |
| BASE STATION 22 | IP ADDRESS 12 | CH 2 |
| BASE STATION 23 | IP ADDRESS 13 | CH 6 |
| BASE STATION 24 | IP ADDRESS 14 | CH 7 |
| BASE STATION 25 | IP ADDRESS 15 | CH 3 |
| BASE STATION 26 | IP ADDRESS 16 | CH 4 |
| BASE STATION 27 | IP ADDRESS 17 | CH 1 |
| BASE STATION 28 | IP ADDRESS 18 | CH 2 |
| BASE STATION 29 | IP ADDRESS 19 | CH 6 |
| | | |
| MOBILE STATION 30 | IP ADDRESS 20 | |
| MOBILE STATION 31 | IP ADDRESS 21 | |
| MOBILE STATION 32 | IP ADDRESS 22 | |
| | | |
| STATIONARY TERMINAL STATION 33 | IP ADDRESS 23 | |

FIG.9

| RADIO-CHANNEL INFORMATION OF ADJACENT BASE STATION | IP ADDRESS OF ADJACENT BASE STATION |
|---|---|
| RADIO-CHANNEL INFORMATION OF ADJACENT BASE STATION 1 | IP ADDRESS OF ADJACENT BASE STATION 1 |
| RADIO-CHANNEL INFORMATION OF ADJACENT BASE STATION 2 | IP ADDRESS OF ADJACENT BASE STATION 2 |
| ~ | ~ |
| RADIO-CHANNEL INFORMATION OF ADJACENT BASE STATION A | IP ADDRESS OF ADJACENT BASE STATION A |

FIG.10

| MOBILE STATION IDENTIFICATION | NUMBER OF CHILD BASE STATIONS | NUMBER OF PARTICIPATING CHILD BASE STATIONS | IP ADDRESS LIST OF CHILD BASE STATIONS | PERIOD FOR WHICH CHILD BASE STATIONS ARE VALID |
|---|---|---|---|---|
| MOBILE STATION IDENTIFICATION 1 | NUMBER OF CHILD BASE STATIONS 1 | NUMBER OF PARTICIPATING CHILD BASE STATIONS 1 | IP ADDRESS LIST OF CHILD BASE STATIONS 1 | PERIOD FOR WHICH CHILD BASE STATIONS ARE VALID 1 |
| MOBILE STATION IDENTIFICATION 2 | NUMBER OF CHILD BASE STATIONS 2 | NUMBER OF PARTICIPATING CHILD BASE STATIONS 2 | IP ADDRESS LIST OF CHILD BASE STATIONS 2 | PERIOD FOR WHICH CHILD BASE STATIONS ARE VALID 2 |
| MOBILE STATION IDENTIFICATION N | NUMBER OF CHILD BASE STATIONS N | NUMBER OF PARTICIPATING CHILD BASE STATIONS N | IP ADDRESS LIST OF CHILD BASE STATIONS N | PERIOD FOR WHICH CHILD BASE STATIONS ARE VALID N |

FIG.11

| MOBILE STATION IDENTIFICATION | RADIO-CHANNEL INFORMATION | IP ADDRESS OF PARENT BASE STATION | PERIOD FOR WHICH PARENT BASE STATION IS VALID |
|---|---|---|---|
| MOBILE STATION IIDENTIFICATION 1 | RADIO-CHANNEL INFORMATION 1 | IP ADDRESS OF PARENT BASE STATION 1 | PERIOD FOR WHICH PARENT BASE STATION IS VALID 1 |
| MOBILE STATION IDENTIFICATION 2 | RADIO-CHANNEL INFORMATION 2 | IP ADDRESS OF PARENT BASE STATION 2 | PERIOD FOR WHICH PARENT BASE STATION IS VALID 2 |
| ⁓ | ⁓ | ⁓ | ⁓ |
| MOBILE STATION IDENTIFICATION M | RADIO-CHANNEL INFORMATION M | IP ADDRESS OF PARENT BASE STATION M | PERIOD FOR WHICH PARENT BASE STATION IS VALID M |

FIG.12

| MOBILE STATION IDENTIFICATION | SEQUENCE NUMBER | DEADLINE FOR RECEIVING SIGNAL | NUMBER OF RECEIVED SIGNALS | LIST OF RECEIVED SIGNALS |
|---|---|---|---|---|
| MOBILE STATION IDENTIFICATION 1 | SEQUENCE NUMBER 1 | DEADLINE FOR RECEIVING SIGNAL 1 | NUMBER OF RECEIVED SIGNALS 1 | LIST OF RECEIVED SIGNALS 1 |
| MOBILE STATION IDENTIFICATION 2 | SEQUENCE NUMBER 2 | DEADLINE FOR RECEIVING SIGNAL 2 | NUMBER OF RECEIVED SIGNALS 2 | LIST OF RECEIVED SIGNALS 2 |
| ⁓ | ⁓ | ⁓ | ⁓ | ⁓ |
| MOBILE STATION IDENTIFICATION P | SEQUENCE NUMBER P | DEADLINE FOR RECEIVING SIGNAL P | NUMBER OF RECEIVED SIGNALS P | LIST OF RECEIVED SIGNALS P |

FIG.13

| RADIO-CHANNEL INFORMATION | RECEIVED SIGNAL STRENGTH |
|---|---|
| RADIO-CHANNEL INFORMATION 1 | RECEIVED SIGNAL STRENGTH 1 |
| RADIO-CHANNEL INFORMATION 2 | RECEIVED SIGNAL STRENGTH 2 |
| ⁓ | ⁓ |
| RADIO-CHANNEL INFORMATION C | RECEIVED SIGNAL STRENGTH 3 |

FIG.14

| RADIO-CHANNEL INFORMATION OF ADJACENT BASE STATION | RECEIVED SIGNAL STRENGTH OF RADIO CHANNEL OF ADJACENT BASE STATION |
|---|---|
| RADIO-CHANNEL INFORMATION OF ADJACENT BASE STATION 1 | RECEIVED SIGNAL STRENGTH OF RADIO CHANNEL OF ADJACENT BASE STATION 1 |
| RADIO-CHANNEL INFORMATION OF ADJACENT BASE STATION 2 | RECEIVED SIGNAL STRENGTH OF RADIO CHANNEL OF ADJACENT BASE STATION 2 |
| ⁓ | ⁓ |
| RADIO-CHANNEL INFORMATION OF ADJACENT BASE STATION A | RECEIVED SIGNAL STRENGTH OF RADIO CHANNEL OF ADJACENT BASE STATION A |

FIG.17

| RADIO-CHANNEL INFORMATION | RECEIVED SIGNAL STRENGTH |
|---|---|
| CH 1 | 10 |
| CH 2 | 30 |
| CH 3 | 5 |
| CH 4 | 50 |
| CH 5 | 35 |
| CH 6 | 15 |
| CH 7 | 40 |

FIG.18

| RADIO-CHANNEL INFORMATION OF ADJACENT BASE STATION | IP ADDRESS OF ADJACENT BASE STATION |
|---|---|
| CH 1 | IP ADDRESS 4 |
| CH 2 | IP ADDRESS 5 |
| CH 3 | IP ADDRESS 8 |
| CH 5 | IP ADDRESS 10 |
| CH 6 | IP ADDRESS 13 |
| CH 7 | IP ADDRESS 14 |

FIG.19B

| MOBILE STATION IDENTIFICATION INDICATING ALL MOBILE STATIONS | 10 |
|---|---|
| RADIO CHANNEL INFORMATION SIGNAL | 25 |
| | 6 |
| | CH 1 |
| | CH 2 |
| | CH 3 |
| | CH 5 |
| | CH 6 |
| | CH 7 |

FIG.19A

| MOBILE STATION IDENTIFICATION (ALL MOBILE STATIONS) |
|---|
| SEQUENCE NUMBER |
| TYPE OF SIGNAL (RADIO CHANNEL INFORMATION SIGNAL) |
| RECEPTION-LEVEL THRESHOLD |
| NUMBER OF ADJACENT BASE STATIONS (A) |
| RADIO-CHANNEL INFORMATION OF ADJACENT BASE STATION 1 |
| ⁝ |
| RADIO-CHANNEL INFORMATION OF ADJACENT BASE STATION A |

FIG.20

| RADIO-CHANNEL INFORMATION OF ADJACENT BASE STATION | RECEIVED SIGNAL STRENGTH OF RADIO CHANNEL OF ADJACENT BASE STATION |
|---|---|
| CH 1 | 10 |
| CH 2 | 30 |
| CH 3 | 5 |
| CH 5 | 35 |
| CH 6 | 15 |
| CH 7 | 40 |

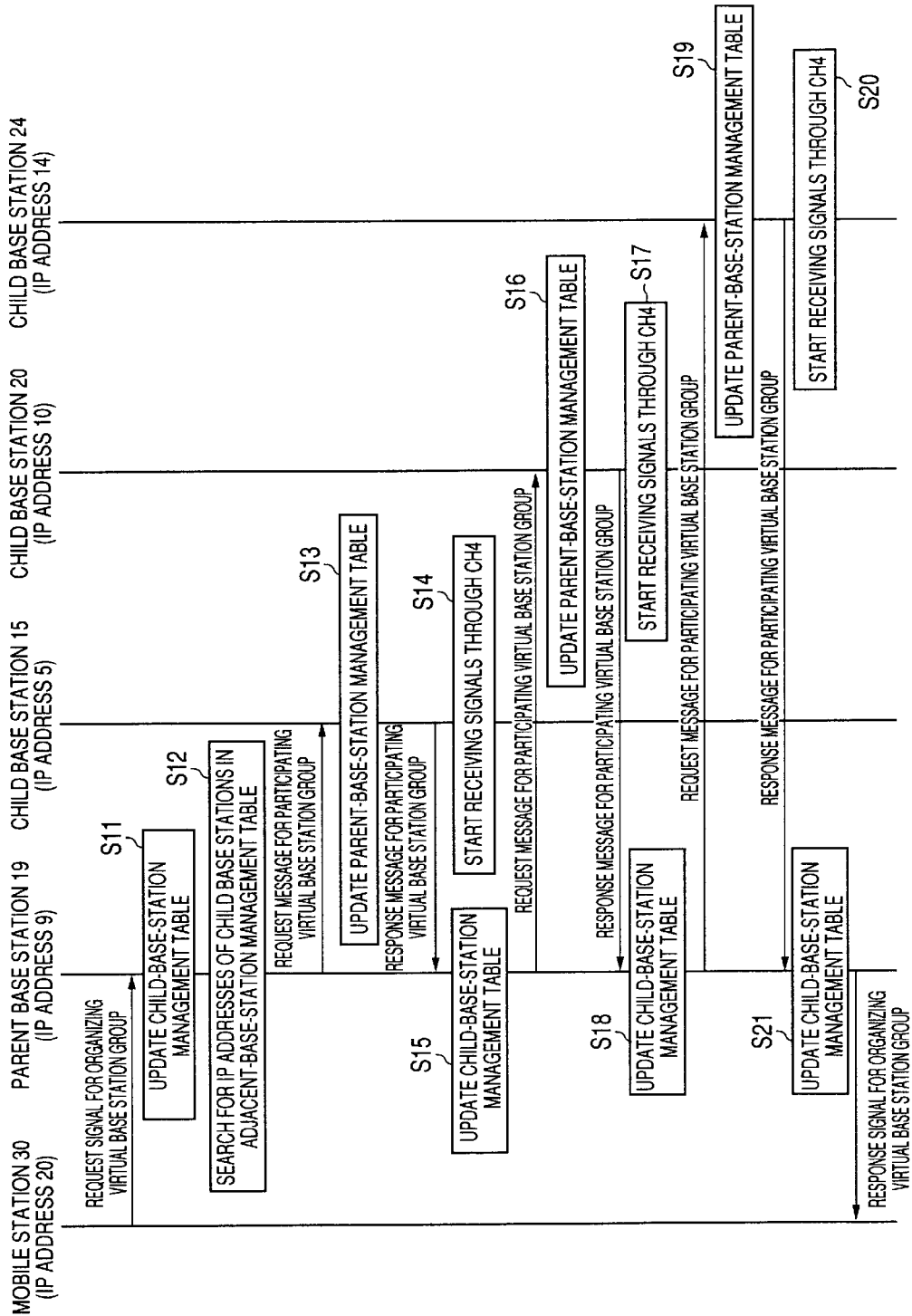

FIG. 22A

| MOBILE STATION IDENTIFICATION(OWN MOBILE STATION IDENTIFICATION) |
|---|
| SEQUENCE NUMBER |
| TYPE OF SIGNAL(REQUEST SIGNAL FOR ORGANIZING VIRTUAL BASE STATION GROUP) |
| NUMBER OF CHILD BASE STATION(N) |
| RADIO-CHANNEL INFORMATION OF CHILD BASE STATION 1 |
| ⋮ |
| RADIO-CHANNEL INFORMATION OF CHILD BASE STATION N |

FIG.22B

| MOBILE STATION IDENTIFICATION 1 |
|---|
| 10 |
| REQUEST SIGNAL FOR ORGANIZING VIRTUAL BASE STATION GROUP |
| 3 |
| CH 2 |
| CH 5 |
| CH 7 |

FIG.23

| MOBILE STATION IDENTIFICATION | NUMBER OF CHILD BASE STATIONS | NUMBER OF PARTICIPATING CHILD BASE STATIONS | IP ADDRESS LIST OF CHILD BASE STATIONS | PERIOD FOR WHICH CHILD BASE STATIONS ARE VALID |
|---|---|---|---|---|
| MOBILE STATION IDENTIFICATION 1 | 3 | 0 | EMPTY | EMPTY |

FIG.24A

| TYPE OF MESSAGE (REQUEST MESSAGE FOR PARTICIPATING VIRTUAL BASE STATION GROUP) |
|---|
| RADIO-CHANNEL INFORMATION OF PARENT BASE STATION |
| MOBILE STATION IDENTIFICATION |

FIG.24B

| REQUEST MESSAGE FOR PARTICIPATING VIRTUAL BASE STATION GROUP |
|---|
| CH 4 |
| MOBILE STATION IDENTIFICATION 1 |

FIG.25

| MOBILE STATION IDENTIFICATION | RADIO-CHANNEL INFORMATION | IP ADDRESS OF PARENT BASE STATION | PERIOD FOR WHICH PARENT BASE STATION IS VALID |
|---|---|---|---|
| MOBILE STATION IDENTIFICATION 1 | CH 4 | IP ADDRESS 9 | PERIOD FOR WHICH PARENT BASE STATION IS VALID 1 |

FIG.26A

| TYPE OF MESSAGE (RESPONSE MESSAGE FOR PARTICIPATING VIRTUAL BASE STATION GROUP) |
|---|
| MOBILE STATION IDENTIFICATION |
| RADIO-CHANNEL INFORMATION OF PARENT BASE STATION |

FIG.26B

| RESPONSE MESSAGE FOR PARTICIPATING VIRTUAL BASE STATION GROUP |
|---|
| MOBILE STATION IDENTIFICATION 1 |
| CH 4 |

FIG.27

| MOBILE STATION IDENTIFICATION | NUMBER OF CHILD BASE STATIONS | NUMBER OF PARTICIPATING CHILD BASE STATIONS | IP ADDRESS LIST OF CHILD BASE STATIONS | PERIOD FOR WHICH CHILD BASE STATIONS ARE VALID |
|---|---|---|---|---|
| MOBILE STATION IDENTIFICATION 1 | 3 | 3 | IP ADDRESS 5, IP ADDRESS 10, IP ADDRESS 14 | PERIOD FOR WHICH CHILD BASE STATIONS ARE VALID 1 |

FIG.28A

| MOBILE STATION IDENTIFICATION(IDENTIFICATION OF OWN MOBILE STATION) |
|---|
| SEQUENCE NUMBER |
| TYPE OF SIGNAL(RESPONSE SIGNAL FOR ORGANIZING VIRTUAL BASE STATION GROUP) |

FIG.28B

| MOBILE STATION IDENTIFICATION 1 |
|---|
| SEQUENCE NUMBER |
| RESPONSE SIGNAL FOR ORGANIZING VIRTUAL BASE STATION GROUP |

FIG.32

| MOBILE STATION IDENTIFICATION | SEQUENCE NUMBER | DEADLINE FOR RECEIVING SIGNAL | NUMBER OF RECEIVED SIGNALS | LIST OF RECEIVED SIGNALS |
|---|---|---|---|---|
| MOBILE STATION IDENTIFICATION 1 | 20 | DEADLINE FOR RECEIVING SIGNAL 1 | 3 | SIGNAL RECEIVED BY CHILD BASE STATION 15<br>SIGNAL RECEIVED BY CHILD BASE STATION 20<br>SIGNAL RECEIVED BY CHILD BASE STATION 24 |

■ PARENT BASE STATION } VIRTUAL BASE STATION GROUP
▨ CHILD BASE STATION
☐ OTHER BASE STATION
▨ MOBILE STATION

- ■ PARENT BASE STATION ⎫
- ▨ CHILD BASE STATION  ⎬ VIRTUAL BASE STATION GROUP
- □ OTHER BASE STATION
- ▨ MOBILE STATION

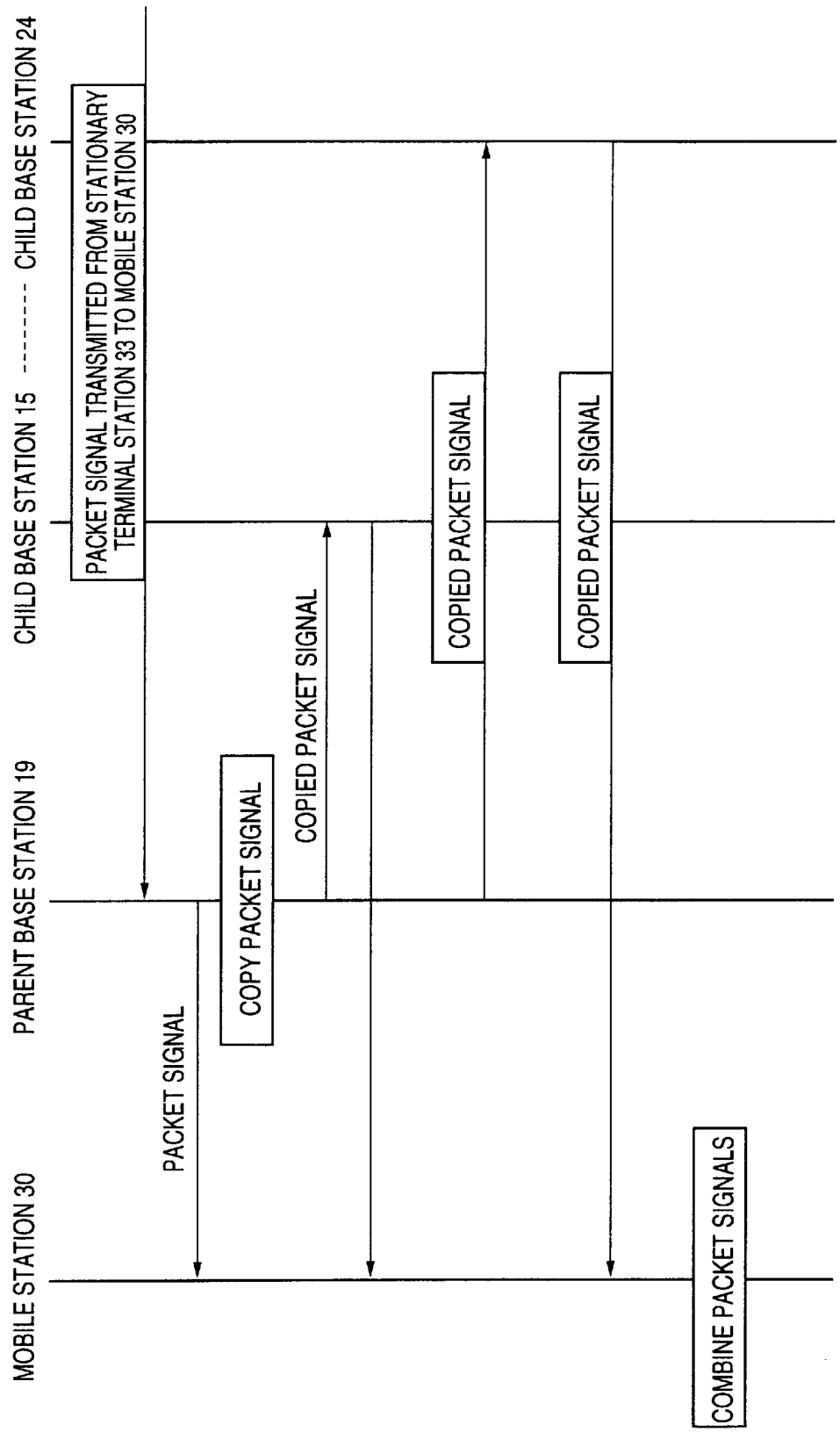

METHOD AND APPARATUS FOR STABILIZING COMMUNICATION IN MOBILE COMMUNICATION SYSTEM

BACKGROUND OF THE INVENTION

1. Field of the Invention

The present invention relates to a mobile communication system supplying communication services from a base station to a mobile station such as a cellular phone through a radio channel, and more particularly relates to a mobile communication system in which a mobile station and a plurality of base stations exchange information with each other.

2. Description of the Related Art

A conventional mobile communication system is shown in FIG. 1. A mobile communication system 100 shown in FIG. 1 includes a mobile station 101, base stations 102 through 108, radio network controllers 109 and 110, and a switch station 111. The switch station 111, the radio network controllers 109 and 110, and the base stations 102 through 108 are connected to each other hierarchically. The base stations 102 through 108 form radio zones indicated by broken lines in FIG. 1. The mobile station 101 capable of moving freely between the radio zones is connected to one of the base stations 102 through 108 in the radio zones, for example, the base station 105, by a radio channel. The mobile station 101 and the base station 105 connected to each other by the radio channel execute bi-directional communication through the radio channel. Each base station shown in FIG. 1 communicates with one or more mobile stations through radio channels. Each of the base stations 102, 104 and 107 is connected to the radio network controller 109, and communicates with the radio network controller 109. Similarly, each of the base stations 103, 105, 106 and 108 is connected to the radio network controller 110, and communicates with the radio network controller 110.

Each of the radio network controllers 109 and 110 is connected to a plurality of base stations, and controls switching a base station communicating with the mobile station 101 when the mobile station 101 moves between the radio zones. The mobile station 101 switches the radio channel when one of the radio network controllers 109 and 110 switches the base station with another base station to be connected with the mobile station 101, in other words, when one of the radio network controllers 109 and 110 hands over a communication with the mobile station 101 from the base station to another base station. The switch station 111 is connected to the radio network controllers 109 and 110, and to a plurality of other switch stations or network systems not shown in the figures. The switch station 111 controls a connection between mobile stations located under the switch station 111, and a connection between a mobile station located under the switch station 111 and a terminal station located under another switch station or another network system.

In a conventional mobile communication system, a radio-channel connection between a base station and a mobile station is executed by following a multiple-accessing method such as an FDMA (Frequency Division Multiple Access) method, a TDMA (Time Division Multiple Access) method, and a CDMA (Code Division Multiple Access) method. Accordingly, the conventional mobile communication system can supply both circuit-switched and packet-switched communication services to mobile stations by having the above-described system structure.

In the above-described mobile communication system 100, the mobile station 101 selects a base station by which a received-signal strength of the radio channel between the mobile station 101 and the base station becomes the highest among the base stations, for instance, the base station 105 shown in FIG. 1. The base station 105 selected by the mobile station 101 is referred to as a selected base station. Since directivity of an antenna of the mobile station 101 is low, a signal transmitted from the mobile station 101 reaches a base station, for example, the base station 103 located near the selected base station 105, while the mobile station 101 is communicating with the selected base station 105. The signal is also received by the other base stations in addition to the selected base station 105 especially when the mobile station 101 is positioned at a border of the radio zones.

In a mobile communication system using the CDMA method as a transmission method of a radio channel, a plurality of base stations can receive a signal transmitted from a single mobile station simultaneously by using a plurality of radio channels or spreading codes. For instance, as shown in FIG. 2, a mobile station 113 is communicating simultaneously with the base stations 106 and 108 by using two spreading codes. Each of the base stations 106 and 108 receives a signal transmitted from the mobile station 101, and transmits the signal to the radio network controller 110. The radio network controller 110 combines signals received from the base stations 106 and 108, and transmits a combined signal to the switch station 111. The above-described communication method of receiving signals from a plurality of base stations at a radio network controller is generally referred to as soft handover, or site diversity. Two typical methods among various methods of combining signals from the plurality of base stations will be described below.

In the first method, each base station transmits demodulated bit information to a radio network controller. Subsequently, the radio network controller regenerates a signal starting from a block that does not contain any errors such by an error correction word and an error correction word unit. In the second method, each base station transmits a received soft decision signal with received-signal strength Intensity (RSSI) or a "signal to noise and interference" ratio S/(N+I) to the radio network controller. The radio network controller regenerates a signal by combining the above-mentioned information received from each bases station with a maximum ratio. By following the above-described methods, an error rate of the signal transmitted from a mobile station is reduced by combining signals received from a plurality of base stations at the radio network controller.

Since the radio network controller combines signals received from the plurality of base stations in the conventional mobile communication system, the radio network controllers 109 and 110 cannot communicate simultaneously with a mobile station 112 respectively through the base stations 102 and 105 by the multiple base station concurrent reception method, as shown in FIG. 2. Thus, the conventional mobile communication system cannot continuously supply communication services based on the multiple base station concurrent reception method to a moving mobile station.

Additionally, in the conventional mobile communication system, a processing load at each radio network controller increases with increase in the number of mobile stations by using the multiple base station concurrent reception method in communication except handover. Furthermore, when transmitting signals from a plurality of base stations to a mobile station, in other words, when executing a multiple base station concurrent transmission or a multiple base station in-order transmission, the conventional mobile communication system contains a problem that the system cannot supply constant communication services to the mobile station depending on a position of the mobile station and a problem that a processing load at a communication node uniting the plurality of base stations increases, since the system must control the plurality of base stations all together.

SUMMARY OF THE INVENTION

Accordingly, it is a general object of the present invention to provide a mobile communication system in which a mobile station and a plurality of base stations communicate with each other. A more specific object of the present invention is to provide a mobile communication system that enables stable communication between communication nodes such as a mobile station and a plurality of base stations, and minimizes a processing load at each communication node.

The above-described object of the present invention is achieved by a mobile communication system including a plurality of base-stations placed in a communication service area and connected to a network, wherein a mobile station communicates with a second station through the plurality of base stations and the network, the mobile communication system including a first means for determining a virtual base station group, that is, an aggregation of the plurality of base stations communicating with the mobile station, based on a condition of a radio transmission path between the mobile station and each base station, and a second means for combining information received by the plurality of base stations that belong to the virtual base station group at a base station included in the virtual base station group, wherein the network connects the plurality of base stations non-hierarchically, wherein the base station transmits combined information whose destination is the second station to the network.

In the mobile communication system, the plurality of base stations placed in the communication service area are connected non-hierarchically to the network. Additionally, the base stations belonging to the virtual base station group are not limited to specific base stations when the mobile station moves in the communication service area. Accordingly, communication between a moving mobile station and the plurality of base stations is stabilized. Additionally, a single base station belonging to the virtual base station group executes processes such as combination of the information and transmission of the combined information that are related to communication between the mobile station and the second station. Accordingly, execution of the processes related to the communication between the mobile station and the second station is not concentrated in a single communication node, even if the number of base stations placed in the communication service area increases.

Other objects, features and advantages of the present invention will become more apparent from the following detailed description when read in conjunction with the accompanying drawings.

BRIEF DESCRIPTION OF THE DRAWINGS

FIG. 1 is a diagram showing a structure of a conventional mobile communication system;

FIG. 3 is a diagram showing a mobile communication system according to an embodiment of the present invention;

FIG. 4 is a diagram showing an IP address of each communication node and a radio channel used by each base station in the mobile communication system;

FIG. 9 is a diagram showing an adjacent-base-station management table;

FIG. 10 is a diagram showing a child-base-station management table;

FIG. 11 is a diagram showing a parent-base-station management table;

FIG. 12 is a diagram showing a received-signal management table;

FIG. 13 is a diagram showing a radio-channel information management table;

FIG. 14 is a diagram showing an adjacent-base-station received-signal-strength management table;

FIG. 17 is a diagram showing an embodiment of the radio-channel information management table containing data;

FIG. 18 is a diagram showing an embodiment of the adjacent-base-station management table containing data;

FIGS. 19A and 19B are diagrams showing a format of a radio-channel information signal transmitted by the base station;

FIG. 20 is a diagram showing an embodiment of the adjacent-base-station received-signal-strength management table containing data;

FIG. 21 is a sequence diagram showing steps performed for organizing a virtual base station group;

FIGS. 22A and 22B are diagrams showing a format of a request signal for organizing the virtual base station group;

FIG. 23 is a diagram showing a record in the child-base-station management table;

FIGS. 24A and 24B are diagrams showing a format of a request message for participating the virtual base station group;

FIG. 25 is a diagram showing a record in the parent-base-station management table;

FIGS. 26A and 26B are diagrams showing a format of a response message for participating the virtual base station group;

FIG. 27 is a diagram showing an updated record in the child-base-station management table;

FIGS. 28A and 28B are diagrams showing a format of a response signal for organizing the virtual base station group;

FIG. 32 is a diagram showing a record in the received-signal management table;

FIG. 37 is a sequence diagram showing steps performed for transmitting the packet signal whose destination is the mobile station from the stationary terminal station.

DESCRIPTION OF THE PREFERRED EMBODIMENTS

Figure 2:
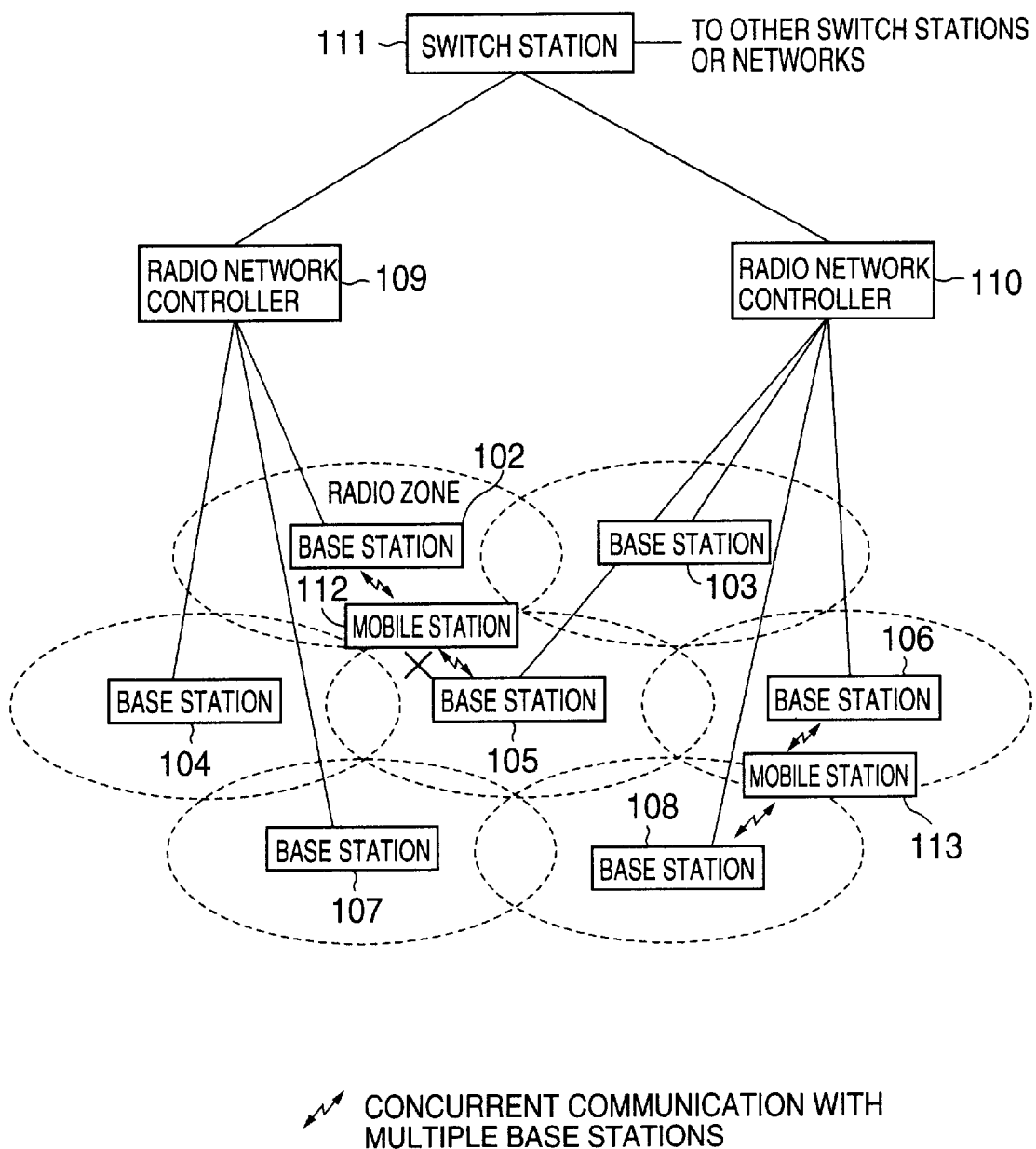
FIG. 2 is a diagram showing communication between a mobile station and a plurality of base stations in the conventional mobile communication system.

A description will now be given of preferred embodiments of the present invention, with reference to the accompanying drawings.

FIG. 3 is a diagram showing a mobile communication system according to an embodiment of the present invention. A mobile communication system 1 shown in FIG. 3 includes a packet communication network 10 and communication nodes that are base stations 11 through 29, mobile stations 30 through 32, and a stationary terminal station 33. The base stations 11 through 29 placed in a communication service area are connected to each other through the packet communication network 10 non-hierarchically. Each base station creates a radio zone. The mobile stations 30, 31 and 32 move inside the communication service area, and communicate with the base stations through radio channels. The stationary terminal station 33 is connected to the packet communication network 10, for instance. The packet communication network 10 is used as a packet transmission path for packets transmitted or received among the base stations 1 through 29, the mobile stations 30 through 32, and the stationary terminal station 33.

A description will be given of the preferred embodiments assuming a packet communication protocol used in the preferred embodiments is an IP (Internet Protocol), which is a typical packet communication protocol. In the above-described mobile communication system 1, an IP address defined at the packet communication network 10 is assigned to each communication node, as shown in FIG. 4. Additionally, a radio channel used by each base station is defined as shown in FIG. 4. Furthermore, mobile station identification (ID) is assigned to each mobile station in addition to an IP address. For example, mobile station IDs 1, 2 and 3 are respectively assigned to the mobile stations 30, 31 and 32.

Figure 5:
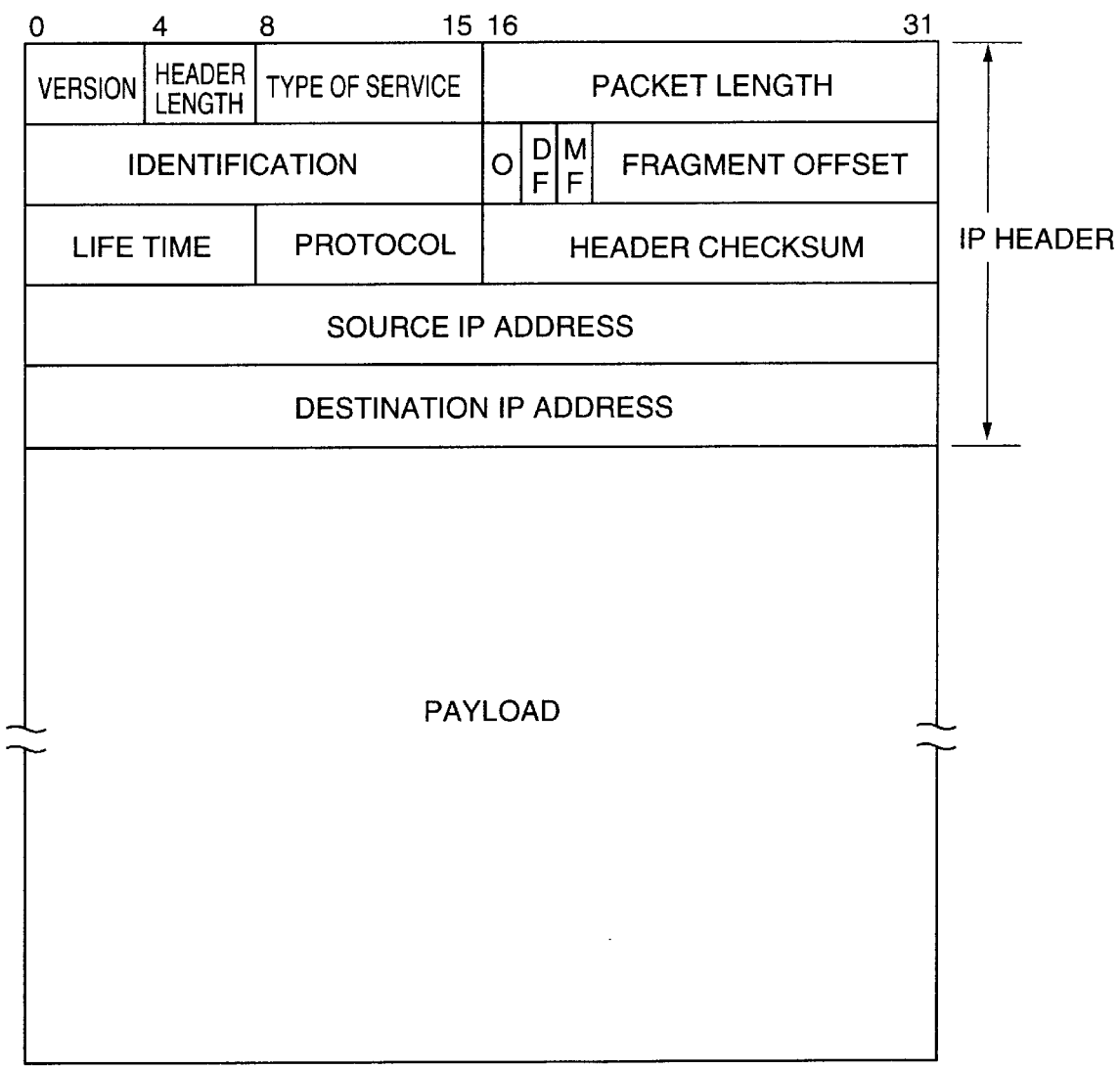
FIG. 5 is a diagram showing a format of an IP packet.

FIG. 5 is a diagram showing a format of an IP packet transmitted through the packet communication network 10. Each packet has two parts, which are an IP header including control information and a payload including contents of information to be transmitted. A source IP address included in the IP header indicates an IP address of a mobile station, a base station, or a stationary terminal station that is an origin of transmitting an IP packet. Additionally, a destination IP address included in the IP header indicates an IP address of a mobile station, a base station, or a stationary terminal station that is a destination station of the IP packet transmitted from the origin. The base stations 11 through 29 communicate with each mobile station through the above-described defined radio channels, and communicate with other base stations and the stationary terminal station 33 through the packer communication network 10. The stationary terminal station 33 communicates with each mobile station through the packet communication network 10, the base stations 11 through 29, and the radio channels.

Figure 6:
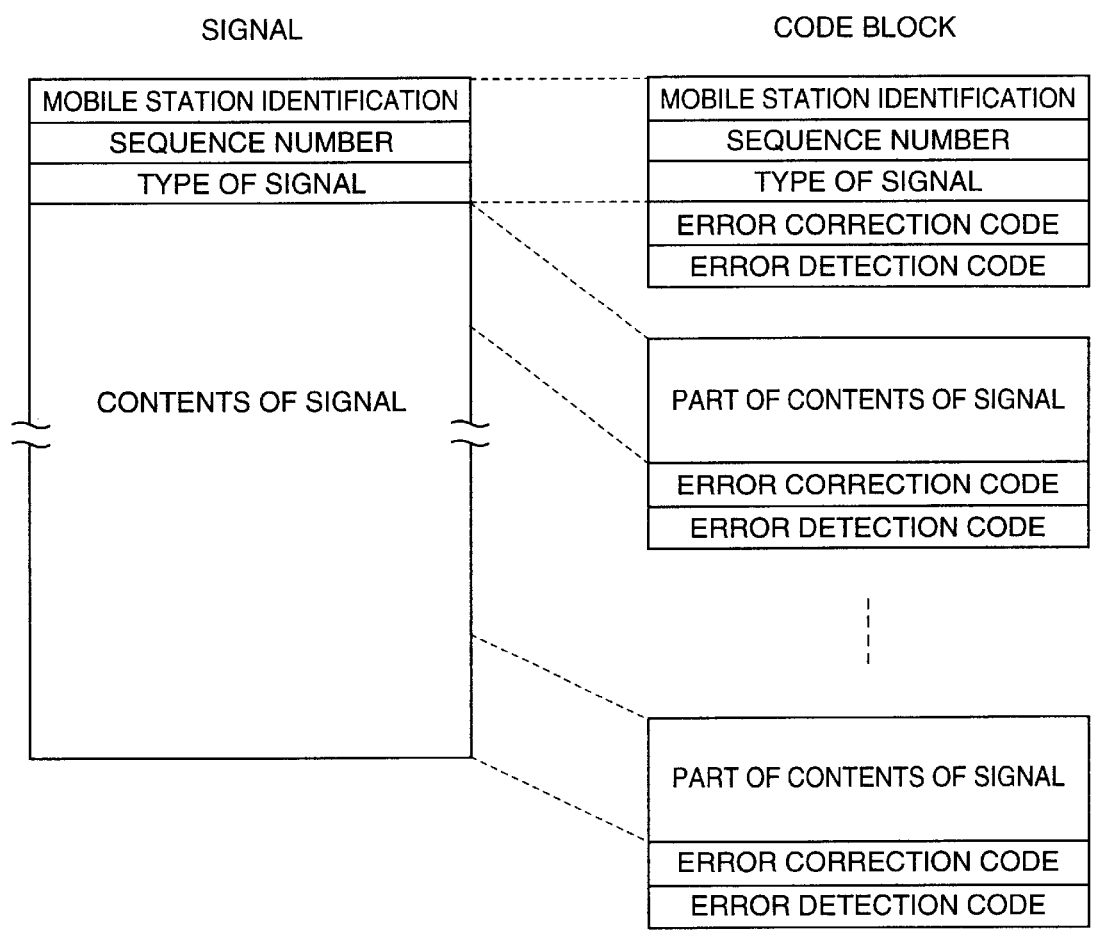
FIG. 6 is a diagram showing a format of a signal transmitted or received between the mobile station and the base station.

A mobile station and a base station transmit or receive a signal through a radio channel, as described above. A format of the signal transmitted or received between the mobile station and the base station is structured as shown in FIG. 6. The signal includes information about mobile station ID, a sequence number, a type of the signal, contents of the signal, an error correction code, and an error detection code. The mobile station ID included in a signal transmitted from the mobile station to the base station specifies the mobile station that is an origin of the signal. The mobile station ID included in a signal transmitted from the base station to the mobile station specifies the mobile station that is a destination of the signal. In other words, since a plurality of mobile stations and a single base station transmit or receive the signal using a single radio channel, a mobile station decides whether a destination of the signal transmitted from the base station is the mobile station, based on the mobile station ID included in the signal. On the other hand, the base station decides which mobile station the signal is transmitted from, based on the mobile station ID included in the signal.

The sequence number is used for distinguishing signals including an identical mobile station ID. A mobile station and a base station increment the sequence number by a predetermined modulo number every time transmitting a new signal. Accordingly, even if a plurality of signals includes the same mobile station ID, their sequence numbers distinguish the signals from each other. A field corresponding to a type of a signal in the signal includes various types of the signal, for instance, a control signal used for controlling communication between a mobile station and a base station, and a packet signal used for transmitting information between the mobile station and a stationary terminal station or between mobile stations. Contents of a signal are contents of information to be transmitted or to be received by a communication node. A composition of the contents differs corresponding to the type of the signal. The mobile station ID, the sequence number, the type of the signal and the contents of the signal are divided into a plurality of code blocks, each having a fixed data length. An error correction code is information used at a signal-receiving side for correcting a transmission error occurs on the signal. The error correction code is added to each code block at a signal-transmitting side. The error detection code is information used at the signal-receiving side for deciding whether the signal is corrected by use of the error correction code. The error detection code is added to each code block having a fixed data length similarly to the error correction code.

Figure 7:
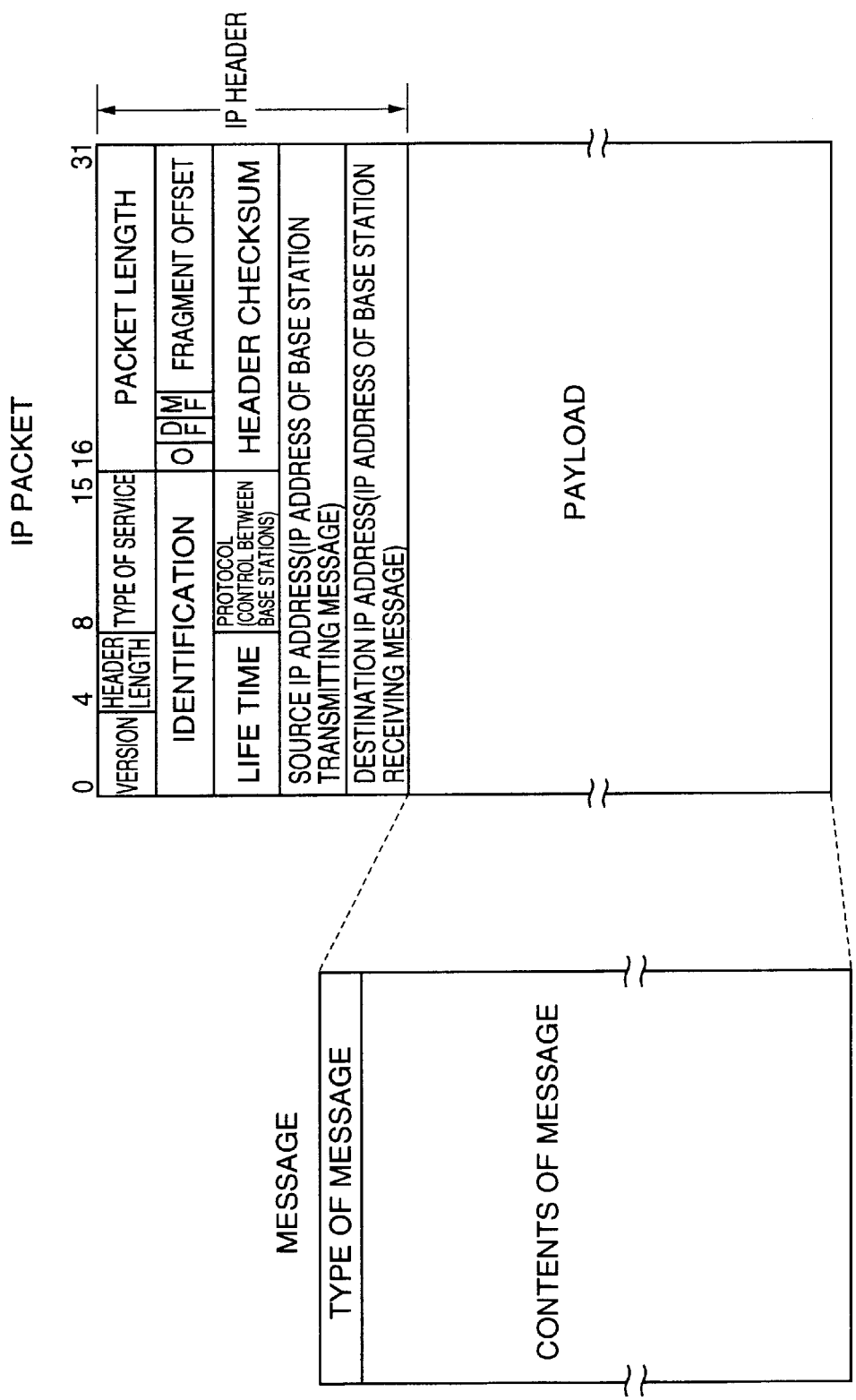
FIG. 7 is a diagram showing a format of a message exchanged between the base stations.

Each of the base stations 11 through 29 transmits a message to or receives the message from the other base stations through the packet communication network 10. A format of the message is shown in FIG. 7, for instance. The message shown in FIG. 7 includes two parts that are a type of the message and contents of the message. The contents of the message are information to be notified to the other base stations, and differ corresponding to the type of the message. Each base station sets control between base stations to the protocol in the IP header of an IP packet, adds the message to the payload of the IP packet, and transmits the IP packet to the other base stations through the packet communication network 10.

Figure 8:
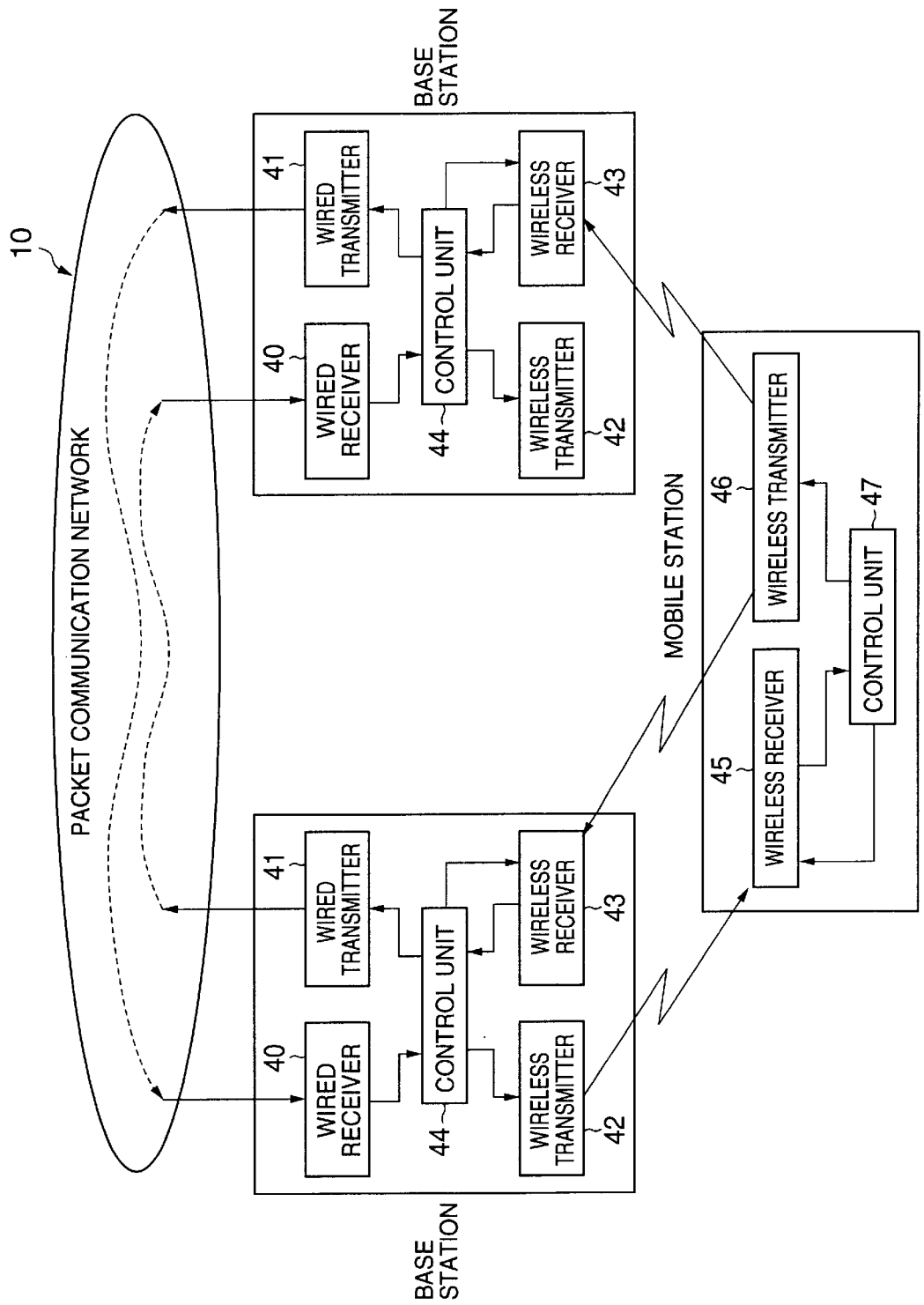
FIG. 8 is a block diagram showing structures of the base station and the mobile station in the mobile communication system.

FIG. 8 is a block diagram showing a structure of each of the base stations 11 through 29 and the mobile stations 30 through 32 in the above-described mobile communication system 1. A base station shown in FIG. 8 includes a wired receiver 40, a wired transmitter 41, a wireless transmitter 42, a wireless receiver 43 and a control unit 44. The wireless receiver 43 of a base station is capable of receiving a signal through radio channels used by adjacent base stations in addition to a radio channel assigned to the base station, and receives various signals transmitted from a plurality of mobile stations. The wireless transmitter 42 of the base station transmits various types of signals to the plurality of mobile stations through the radio channel assigned to the base station. The wired receiver 40 is connected to the packet communication network 10 through a cable, and receives IP packets from the other base stations and the stationary terminal station 33. The wired transmitter 41 is also connected to the packet communication network 10 through the cable, and transmits IP packets to the other base stations and the stationary terminal station 33. The control unit 44 processes the IP packets received by the wired receiver 40, the IP packets to be transmitted by the wired transmitter 41, the various types of signals received from the mobile stations by the wireless receiver 43, and the various types of signals to be transmitted to the mobile stations by the wireless transmitter 42.

The above-described control unit 44 includes an adjacent-base-station management table shown in FIG. 9 that is used for managing base stations adjacent to a base station including the control unit 44, a child-base-station management table shown in FIG. 10, a parent-base-station management table shown in FIG. 11, and a received-signal management table shown in FIG. 12. Each management table includes records, each including a plurality of fields. It should be noted that the number of the records in each management table is variable. Each record of the adjacent-base-station management table includes two fields, which are radio-channel information of an adjacent base station and an IP address of the adjacent base station. Each record of the child-base-station management table includes five fields, which are a mobile station ID, the number of child base stations, the number of participating child base stations, an IP address list of the child base stations, and a period for which the child base stations are valid. Additionally, each record of the parent-base-station management table includes four fields, which are a mobile station ID, radio-channel information, an IP address of a parent base station, a period for which the parent base station is valid. Furthermore, each record of the received-signal management table includes five fields, which are a mobile station ID, a sequence number, a deadline for receiving a signal, the number of received signals, and a list of the received signals.

In FIG. 8, each mobile station includes a wireless receiver 45, a wireless transmitter 46 and a control unit 47. The wireless receiver 45 is capable of receiving a signal through a single radio channel. Additionally, the wireless receiver 45 measures a received-signal strength of the radio channel, and receives various types of signals transmitted from base stations. The wireless transmitter 46 is capable of transmitting a signal through a single radio channel, and transmits various types of signals to the base stations. The control unit 47 specifies a channel to be used by the wireless receiver 45 or the wireless transmitter 46. Additionally, the control unit 47 processes the various type of signals received by the wireless receiver 45 and the various types of signals to be transmitted by the wireless transmitter 46. The control unit 47 includes a radio-channel information management table shown in FIG. 13 and an adjacent-base-station received-signal-strength management table shown in FIG. 14. Each management table includes records, each including a plurality of fields. The number of the records is variable.

The above-mentioned radio-channel information management table includes records, each including two fields, which are radio-channel information and a received-signal strength. Each record in the adjacent-base-station received-signal-strength management table includes two fields, which are radio-channel information of an adjacent base station and a received-signal strength of a radio channel of the adjacent base station.

Figure 15:
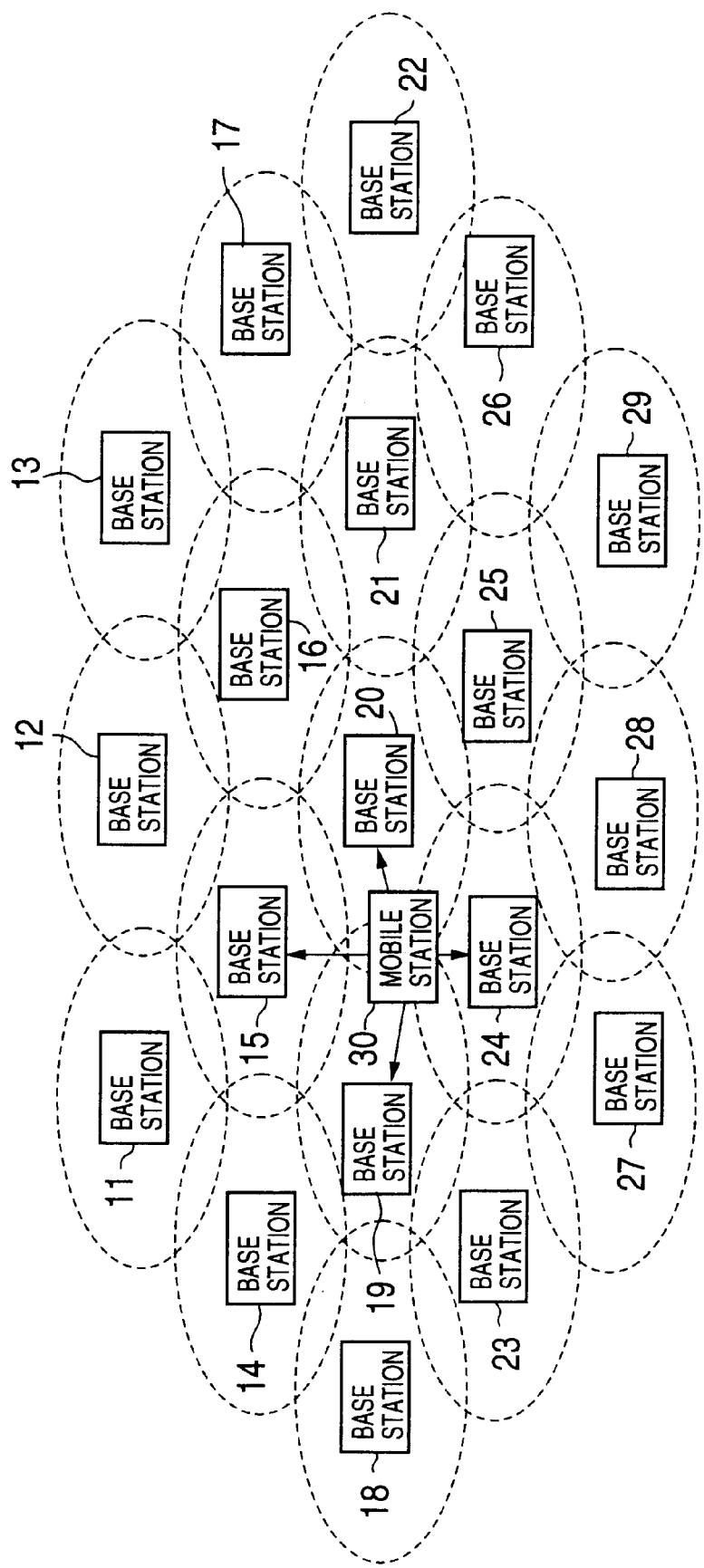
FIG. 15 is a diagram showing a relation between the mobile station and the plurality of base stations communicating with the mobile station in the mobile communication system.

A description will now be given of operations performed by the mobile station 30 and the base stations 19, 20 and 24 in a case in which the mobile station 30 is positioned near borders of the radio zones of the base stations 19, 20 and 24, as shown in FIG. 15. The packet communication network 10 and lines connecting the packet communication network 10 and each base station are omitted in FIG. 15 for a description purpose. A signal transmitted from the mobile station 30 positioned in a call area of a base station is receivable by the other base stations adjacent to the mobile station 30 in addition to the base station. A group of base stations receiving a signal transmitted from a single mobile station is defined as a virtual base station group. A base station whose call area includes the mobile station among the base stations that belong to the virtual base station group is called a parent base station. In addition, base stations that belong to the virtual base station group but are not the parent base station is called child base stations.

Figure 16:
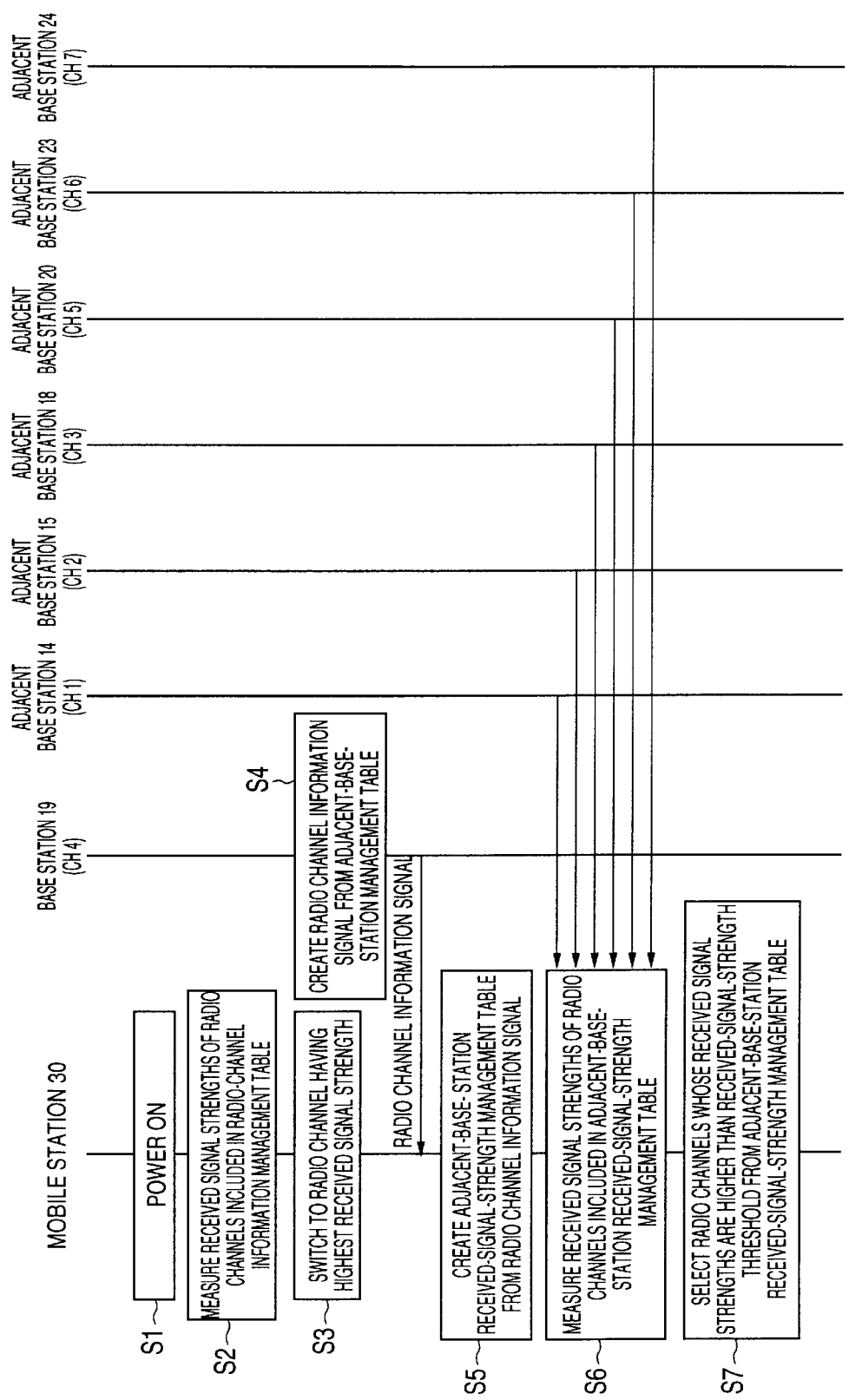
FIG. 16 is a sequence diagram showing steps performed for the mobile station to measure a received-signal strength of the signal transmitted from an adjacent base station.

In the mobile communication system 1, a base station composing the virtual base station group is determined by performing steps shown in FIG. 16. The control unit 47 of the mobile station 30 includes the radio-channel information management table shown in FIG. 13 storing information about radio channels used in the mobile communication system 1. To be concrete, the radio-channel information management table stores, for instance, radio-channel information including information about radio channels CH1 through CH7 and a received-signal strength for each of the radio channels CH1 though CH7 at the mobile station 30, as shown in FIG. 17. The radio-channel information includes a frequency of a radio channel and a slot number of the radio channel in a case of using the TDMA method as a radio-channel transmission method. On the other hand, the radio-channel information includes the frequency of the radio channel and a spreading code number of the radio channel in a case of using the CDMA method as the radio-channel transmission method.

At a step S1 shown in FIG. 16, the mobile station 30 is initially powered on. At a step S2, the mobile station 30 measures received-signal strengths of radio channels specified by the radio-channel information stored in the radio-channel information management table in order. To be concrete, the control unit 47 of the mobile station 30 passes the radio-channel information to the wireless receiver 45 as well as directs the wireless receiver 45 to measure the received-signal strengths of all the radio channels specified by the radio-channel information. Subsequently, the wireless receiver 45 measures a received-signal strength of each radio channel specified by the radio-channel information, and passes a result of measuring the received-signal strength to the control unit 47. The control unit 47, after receiving the result from the wireless receiver 45, records the result as a received-signal strength to a record corresponding to the radio channel specified by the radio-channel information in the radio-channel information management table.

After measuring the received-signal strengths of all the radio channels specified by the radio-channel information, the control unit 47 searches for a record that includes the highest received-signal strength in the radio-channel information management table. For instance, the control unit 47 locates a record including radio-channel information CH4 and a received-signal strength 50 by searching through the radio-channel information management table shown in FIG. 17. Accordingly, a base station using the radio channel CH4, that is, the base station 19 having an IP address 9, is selected as a parent base station of the mobile station 30, based on a table shown in FIG. 4. The base station 19 is referred to as a parent base station 19 hereinafter. Subsequently, the control unit 47 passes the radio-channel information CH4 of the record that includes the highest received-signal strength to the wireless receiver 45 and the wireless transmitter 46. Consequently, at a step S3, the wireless receiver 45 and the wireless transmitter 46 switch their radio channels to the radio channel CH4 specified by the radio-channel information CH4 received from the control unit 47.

The base station 19 that becomes the parent base station of the mobile station 30 by performing the above-described steps S1 through S3 includes, for example, the adjacent-base-station management table shown in FIG. 18 in its control unit 44. At a step S4, the control unit 44 of the base station 19 creates a radio-channel information signal including radio-channel information and a received-signal-strength threshold that are used by other adjacent base stations, with reference to the adjacent-base-station management table. The control unit 44 then supplies the radio-channel information signal to the wireless transmitter 42 that transmits the radio-channel information signal. A format of the radio-channel information signal is shown in FIG. 19A, for example. The format of the radio-channel information signal shown in FIG. 19A includes a mobile station ID, a sequence number, a type of a signal, a received-signal-strength threshold, the number of adjacent base stations, and radio-channel information of the adjacent base stations. In addition, FIG. 19B shows a structure of the radio-channel information signal transmitted by the base station 19 having the IP address 9 as the parent base station of the mobile station 30. The mobile station ID in the radio-channel information signal is set to a fixed mobile station ID indicating all the mobile stations, that is, a broadcast mobile station ID, since the radio-channel information signal is transmitted to all the mobile stations receiving the signals through the same channel as the base station 19.

The wireless receiver 45 of the mobile station 30 passes the radio-channel information signal to the control unit 47 after receiving the radio-channel information signal from the parent base station 19. The control unit 47 receives the radio-channel information signal from the wireless receiver 45, and creates the adjacent-base-station received-signal-strength management table shown in FIG. 14 after obtaining the received-signal-strength threshold and information about radio channels used by base stations adjacent to the parent base station 19 (radio-channel information of adjacent base stations) from the radio-channel information signal, at a step S5 shown in FIG. 16. At a step S6, the mobile station 30 measures received-signal strengths of the radio channels CH1, CH2, CH3, CH5, CH6 and CH7 specified by radio-channel information of the adjacent base stations included in the adjacent-base-station received-signal-strength management table one after another, and records a measured received-signal strength of each radio channel in the adjacent-base-station received-signal-strength management table by relating the measured received-signal strength to its corresponding radio channel of an adjacent base station. Consequently, the control unit 47 of the mobile station 30 obtains the adjacent-base-station received-signal-strength management table containing data shown in FIG. 20.

At a step S7, the control unit 47 selects a record including a received-signal strength that is higher than the received-signal-strength threshold, for example, a received-signal strength 25, from the adjacent-base-station received-signal-strength management table, and sets an adjacent base station that use a radio channel specified by radio-channel information of an adjacent base station included in the selected record, to a child base station of the mobile station 30. For instance, the control unit 47 selects the radio channels CH2, CH5 and CH7 from the adjacent-base-station received-signal-strength management table shown in FIG. 20, and sets the base stations 15, 20 and 24 that respectively use the radio channels CH2, CH5 and CH7 to child base stations of the mobile station 30. As a result, the parent base station 19 having the IP address 9 and a plurality of the child base stations 15, 20 and 24 respectively having IP addresses 5, 10 and 14 are determined as base stations composing the virtual base station group. It should be noted that a position of each mobile station is variable in the mobile communication system 1, and thus base stations composing the virtual base station group vary according to the position of each mobile station. In other words, a base station composing the virtual base station group for a mobile station may not become a part of the virtual base station group for another mobile station. Additionally, since a parent base station and a child base station are determined for each mobile station, a base station that is a parent base station of a mobile station may become a child base station for another mobile station.

A description will now be given of steps performed for organizing a virtual base station group with reference to FIG. 21. The virtual base station group includes the parent base station 19, the child base stations 15, 20 and 24 of the mobile station 30. As shown in FIG. 21, the mobile station 30 transmits a request signal including a list of the radio channels used by the child base stations 15, 20 and 24 for organizing the virtual base station group, to the parent base station 19. The request signal for organizing the virtual base station group is structured as shown in FIGS. 22A and 22B. FIG. 22A is a diagram showing a format of the request signal for organizing the virtual base station group. The format of the request signal shown in FIG. 22A includes a mobile station ID, a sequence number; a type of a signal, the number of child base stations, and radio-channel information of child base stations. In addition, FIG. 22B is a diagram showing a structure of the request signal for organizing the virtual base station group transmitted from the mobile station 30 to the parent base station 19.

After receiving the request signal for organizing the virtual base station group from the mobile station 30, the parent base station 19 checks whether a mobile station ID included in the request signal is also included in the child-base-station management table of the parent base station 19. If the child-base-station management table of the base station 19 includes the mobile station ID, at a step S11, the parent base station 19 updates the number of child base stations, the number of participating child base stations, the IP address list of the child base stations and the period for which the child base stations are valid that are included in a record corresponding to the mobile station ID in the child-base-station management table. To be concrete, the parent base station 19 sets the number of the child base stations equal to the number of the child base stations included in the request signal, and the number of the participating child base stations to "0". Additionally, the parent base station 19 clears the IP address list of the child base stations and the period for which the child base stations are valid.

On the other hand, if the child-base-station management table of the parent base station 19 does not include the mobile station ID included in the request signal for organizing the virtual base station group, the parent base station adds a new record to the child-base-station management table. To be concrete, the parent base station 19 sets the mobile station ID in the new record to the mobile station ID included in the request signal, and the number of the child base stations in the new record to the number of the child base stations included in the request signal. Additionally, the parent base station 19 sets the number of the participating child base stations to "0". Additionally, the parent base station 19 leaves empty space for the IP address list of the child base stations and the period or which the child base stations are valid. A record corresponding to the mobile station ID 1 (mobile station 30) updated or added as described above in the child-base-station management table is structured, for instance, as shown in FIG. 23.

At a step S12, the parent base station 19 searches for an IP address of each child base station with reference to the radio-channel information of the child base stations included in the request signal for organizing the virtual base station group and the adjacent-base-station management table stored in the parent base station 19. Subsequently, the parent base station 19 transmits a request message for participating the virtual base station group to the IP address 5 of the base station 15, the IP address 10 of the base station 20 and the IP address 14 of the base station 24 one after another. The request message is structured, for instance, as shown in FIGS. 24A and 24B. FIG. 22A is a diagram showing a format of the request message for participating the virtual base station group. The format shown in FIG. 22A includes a type of a message, radio-channel information of a parent base station, and a mobile station ID. In addition, FIG. 22B is a diagram showing the request message for participating the virtual base station group, the request message being transmitted from parent base station 19 to the child base station 15. The request message includes the radio-channel information CH4 used by the parent base station 19 and the mobile station ID 1 of the mobile station 30, and is transmitted as an IP packet from the parent base station 19 to each child base station.

After receiving the request message for participating the virtual base station group from the parent base station 19, each of the child base stations 15, 20 and 24 updates a record corresponding to the mobile station 30 (mobile station ID 1) in its own parent-base-station management table, for instance, as shown in FIG. 25 respectively at steps S13, S16 and S19. Each child base station checks whether a mobile station ID included in the request message is also included in the parent-base-station management table of the child base station. If the parent-base-station management table of the child base station includes a record corresponding to the mobile station ID, the child base station updates the radio-channel information, the IP address of the parent base station and the period for which the parent base station is valid, which are provided in the record. To be concrete, the child base station sets the radio-channel information to the radio-channel information CH4 of the parent base station 19 included in the request message for participating the virtual base station group, and the IP address of the parent base station to an IP address of a sender of an IP packet including the request message. Additionally, the child base station sets the period for which the parent base station is valid to a period obtained by adding a fixed period for which the virtual base station group is valid to a current time. It should be noted that the period for which the virtual base station group is valid is a predetermined period included in all the mobile and base stations.

On the other hand, if the parent-base-station management table of the child base station does not include the record corresponding to the mobile station ID included in the request message for participating the virtual base station group, the child base station adds a new record to the parent-base-station management table. To be concrete, the child base station adds the new record including the mobile station ID included in the request message, the radio-channel information CH4 of the parent base station, the IP address of the sender of the IP packet including the request message, the period for which the parent base station is valid to the period obtained by adding the fixed period for which the virtual base station group is valid to the current time, to the parent-base-station management table. After adding or updating the record corresponding the mobile station ID included in the request message to the parent-base-station management table, each of the child base station 15, 20 and 24 starts receiving signals through the radio channel CH4 specified by the radio-channel information CH4 of the parent base station 19 at steps S14, S17 and S20 respectively.

Subsequently, each of the child base stations 15, 20 and 24 transmits a response message for participating the virtual base station group to the parent base station 19. The response message is structured, for instance, as shown in FIGS. 26A and 26B. FIG. 26A is a diagram showing a format of the response message for participating the virtual base station group. The format shown in FIG. 26A includes a type of a message, a mobile station ID and radio-channel information of a parent base station. FIG. 26B is a diagram showing a structure of the response message for participating the virtual base station group transmitted by the child base station 15 to the parent base station 19.

After receiving the response message for participating the virtual base station group from each of the child base stations 15, 20 and 24, the parent base station 19 updates the number of participating child base stations, the IP address list of child base stations and the period for which the child base stations are valid that are included in the record shown in FIG. 23 of the child-base-station management table at steps S15, S18 and S21 respectively, the record corresponding to the mobile station ID included in the response message. To be concrete, the parent base station 19 increments the number of the participating child base stations by one every time the parent base station 19 receives the response message from one of the child base stations 15, 20 and 24, and adds an IP address of a sender of an IP packet including the response message to the IP address list of the child base stations in the child-base-station management table. Additionally, the parent base station 19 sets the period for which the child base stations are valid to a period obtained by adding the period for which the virtual base station group is valid to a current time. Consequently, the parent base station 19, after having received the response message for participating the virtual base station group from each of the child base stations 15, 20 and 24, creates a record shown in FIG. 27 in the child-base-station management table, for instance.

Additionally, after receiving the response message from all the child base stations 15, 20 and 24 to which the parent base station 19 has transmitted the request message for participating the virtual base station group, the parent base station 19 transmits a response signal for organizing the virtual base station group to the mobile station 30 (IP address 20). The response signal for organizing the virtual base station is structured, for example, as shown in FIGS. 28A and 28B. FIG. 28A is a diagram showing a format of the response signal including a mobile station ID, a sequence number and a type of a signal. FIG. 28B is a diagram showing the response signal transmitted by the parent base station 19 to the mobile station 30.

The mobile station 30 sets the period for which the virtual base station group is valid to an internal timer, and starts the internal timer after receiving the response signal from the parent base station 19. When the period for which the virtual base station group is valid expires, the mobile station 30 retransmits the previously transmitted request signal for organizing the virtual base station group to the parent base station 19, and reassigns the period for which the virtual base station group is valid to the internal timer. The parent base station 19 constantly checks the period for which the child base stations are valid for every record in the child-base-station management table, and deletes a record including a period for which child base stations are valid that is equal to a current time from the child-base-station management table. Additionally, each of the child base stations 15, 20 and 24 checks the period for which the parent base station is valid for every record in the parent-base-station management table, and deletes a record including a period for which the parent base station is valid that is equal to the current time from the parent-base-station management table.

Figure 29:
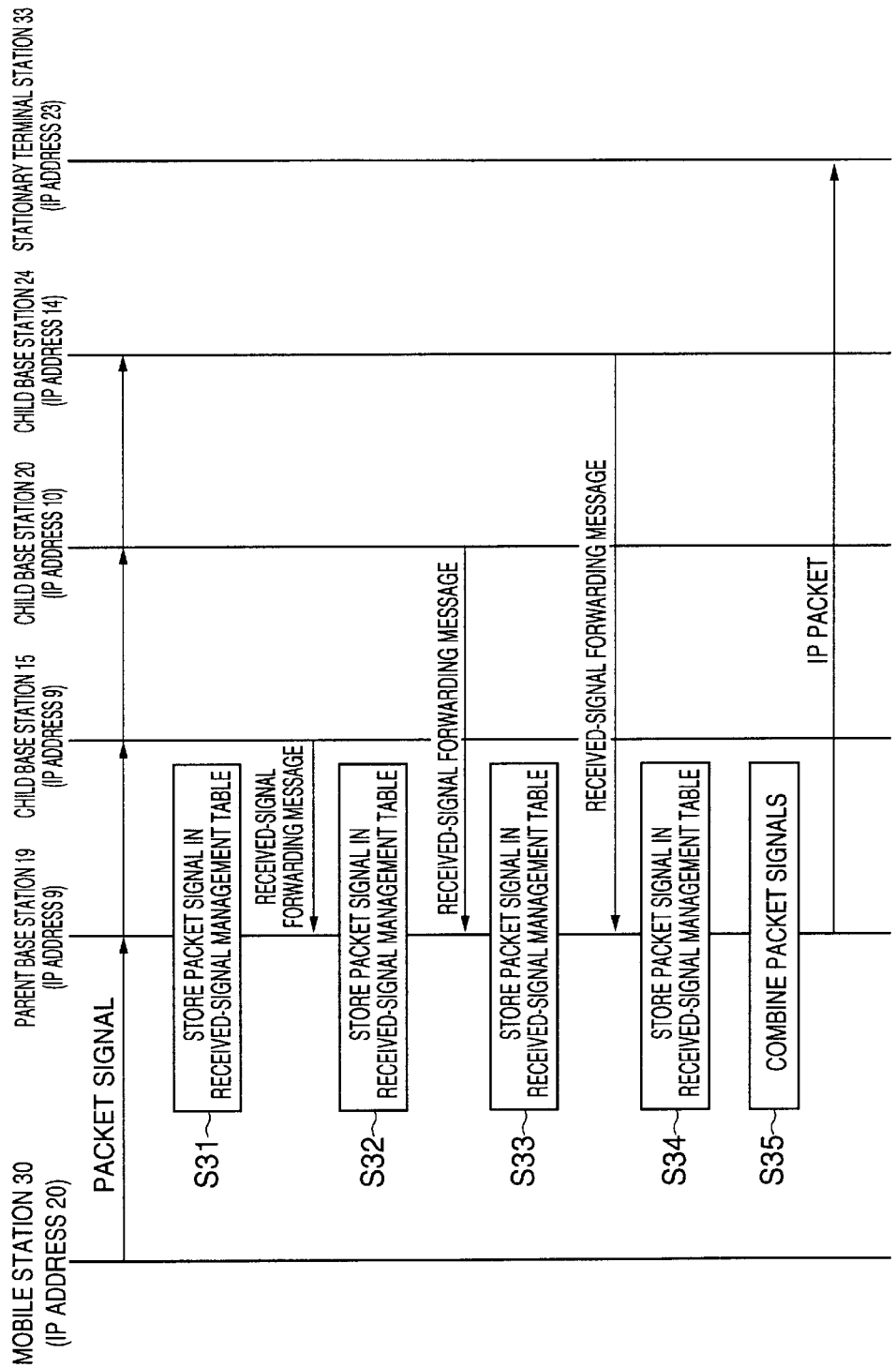
FIG. 29 is a sequence diagram showing steps performed for combining packet signals in the virtual base station group.
Figure 30:
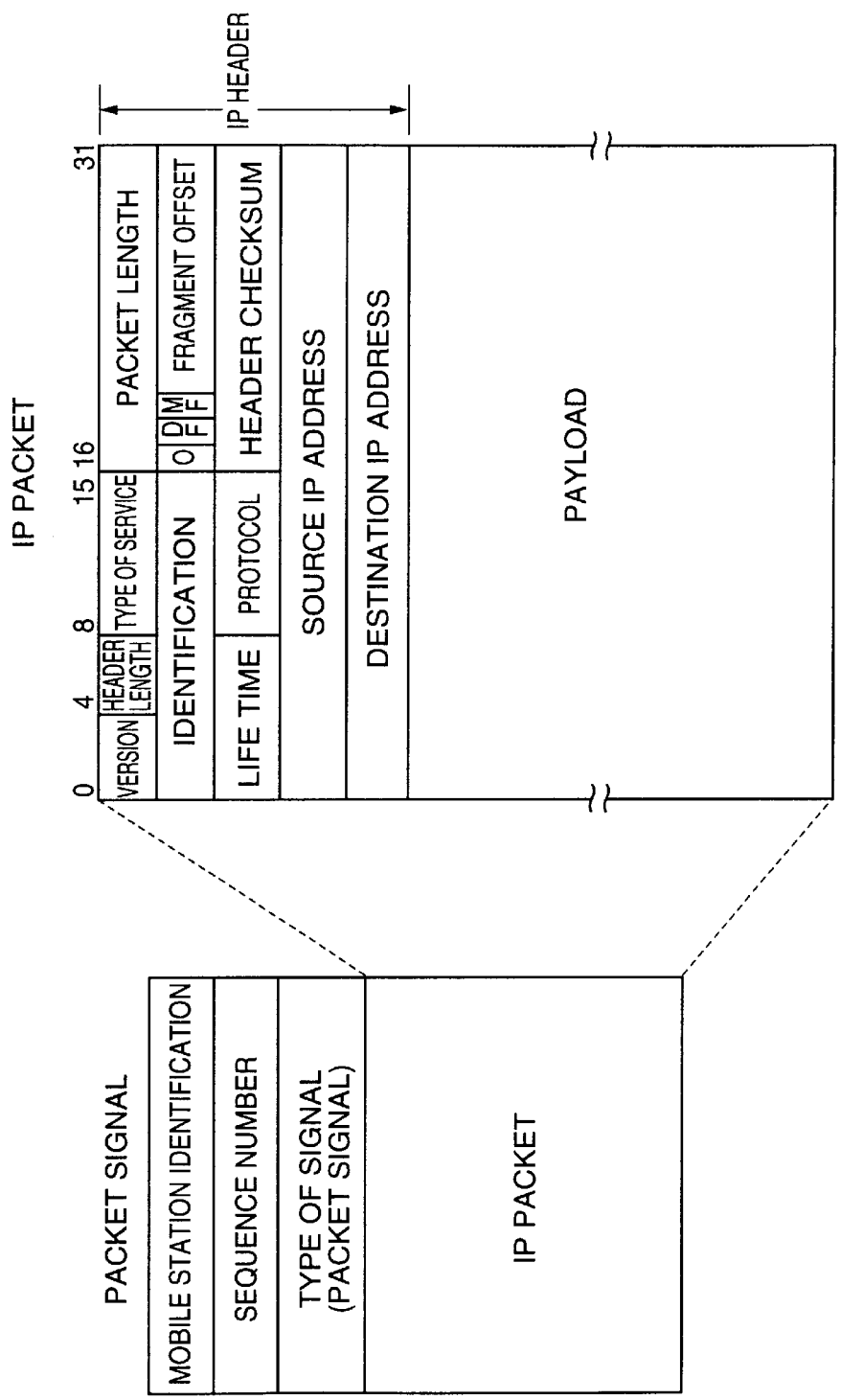
FIG. 30 is a diagram showing a format of a packet signal including the IP packet.
Figure 31:
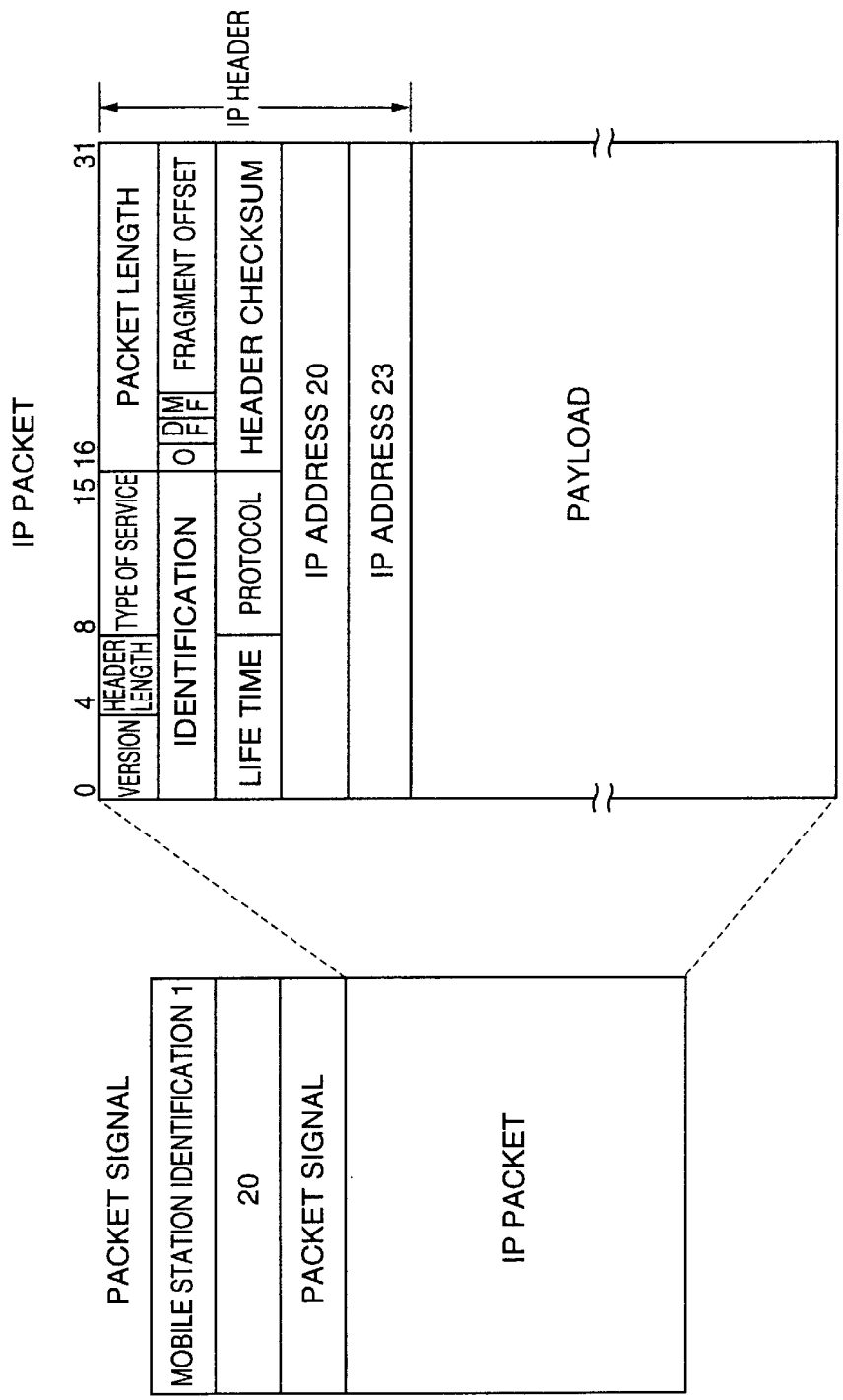
FIG. 31 is a diagram showing a structure of the packet signal transmitted from the mobile station to a stationary terminal station.

A description will now be given of a method of communicating between the mobile station 30 and the virtual base station group including the base stations 19, 15, 20 and 24. The base stations 19, 15, 20 and 24 communicate with the mobile station 30 by following steps shown in FIG. 29 after constructing the virtual base station group for the mobile station 30. FIG. 29 shows a case in which the mobile station 30 transmits an IP packet to the stationary terminal station 33. To be concrete, the mobile station 30 transmits a packet signal including the IP packet whose destination is the stationary terminal station 33. The packet signal is structured, for instance, as shown in FIGS. 30 and 31. FIG. 30 is a diagram showing a format of the packet signal. Additionally, FIG. 31 is a diagram showing a structure of the packet signal transmitted by the mobile station 30 having the IP address 20 and the mobile station ID 1 to the stationary terminal station 33 having an IP address 23. As shown in FIG. 30, the packet signal includes a mobile station ID, a sequence number, a type of a signal and an IP packet. The packet signal transmitted by the mobile station 30 is received by each of the child base stations 15, 20 and 24 in addition to the parent base station 19.

The parent base station 19 checks whether a record corresponding to the mobile station ID included in the packet signal exists in the child-base-station management table after receiving the packet signal through a radio channel assigned to the parent base station 19. If the record corresponding to the mobile station ID exists in the child-base-station management table, the parent base station 19 further checks whether a record corresponding to a combination of the mobile station ID and the sequence number included in the packet signal exists in the received-signal management table of the parent base station 19 shown in FIG. 12. A record in the received-signal management table is structured, for example, as shown in FIG. 32. If the record corresponding to the combination of the mobile station ID and the sequence number included in the packet signal exists in the received-signal management table, the parent base station updates the number of received signals and the list of the received signals in the record at a step S31. In other words, the parent base station 19 increments the number of the received signals by one, and adds a received packet signal to the list of the received signals. On the other hand, if the record corresponding to the combination of the mobile station ID and the sequence number included in the packet signal does not exist in the received-signal management table, the parent base station 19 adds a new record corresponding to the combination of the mobile station ID and the sequence number to the received-signal management table, and sets values to each field in the record at the step S31. In other words, the parent base station 19 stores the mobile station ID and the sequence number included in the packet signal to fields corresponding to the mobile station ID and the sequence number in the new record of the received-signal management table. Additionally, the parent base station 19 sets an addition of a waiting period for receiving a signal and a current time to a field corresponding to the deadline for receiving the signal, a value "1" to a field corresponding to the number of the received signals, and the received packet signal to a field corresponding to the list of the received signals in the received-signal management table.

Figure 33A:
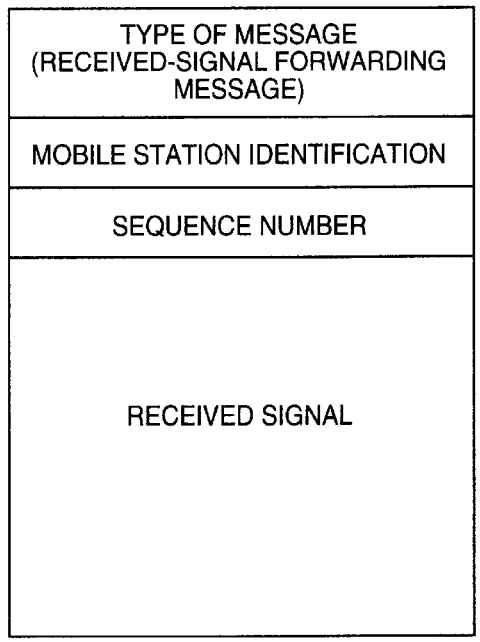
FIGS. 33A and 33B are diagrams showing a structure of a received-signal forwarding message.
Figure 33B:
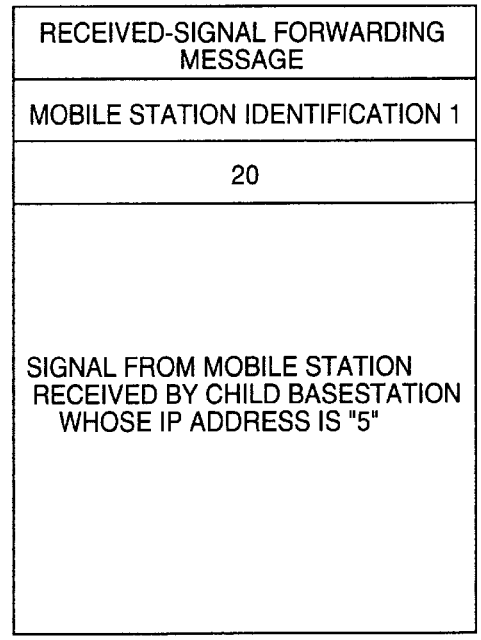

Each of the child base stations 15, 20 and 24 checks whether a record corresponding to the mobile station ID included in the packet signal exists in the parent-base-station management table shown in FIG. 11, after receiving the packet signal through the radio channel assigned to the parent base station 19. If the record corresponding to the mobile number exists in the parent-base-station management table, each of the child base stations 15, 20 and 24 searches for the IP address 9 of the parent base station 19 in the parent-base-station management table, and creates a received-signal forwarding message. Subsequently, each of the child base stations 15, 20 and 24 transmits the received-signal forwarding message to the parent base station 19. The received-signal forwarding message is structured, for instance, as shown in FIGS. 33A and 33B. FIG. 33A is a diagram showing a format of the received-signal forwarding message. The format shown in FIG. 33A includes a type of a message, a mobile station ID, a sequence number and a received signal. FIG. 33B is a diagram showing a structure of the received-signal forwarding message transmitted from the child base station 15 (IP address 5) to the parent base station 19 (IP address 9). On the other hand, if the record corresponding to the mobile station ID included in the packet signal does not exist in the parent-base-station management table, each of the child base stations 15, 20 and 24 discards the packet signal.

Every time the parent base station 19 receives the received-signal forwarding message from any of the child base stations 15, 20 and 24, the parent base station 19 checks whether a record corresponding to the mobile station ID included in the received-signal forwarding message exists in the child-base-station management table. If the record corresponding to the mobile station ID included in the received-signal forwarding message does not exist in the child-base-station management table, the parent base station 19 discards the received-signal forwarding message received from the child base stations 15, 20 and 24. On the other hand, if the record corresponding to the mobile station ID included in the received-signal forwarding message exists in the child-base-station management table, the parent base station 19 further checks whether a record corresponding to a combination of the mobile station ID and the sequence number included in the received-signal forwarding message exists in the received-signal management table. If the record corresponding to the combination of the mobile station ID and the sequence number included in the received-signal forwarding message exists in the received-signal management table, the parent base station 19 updates the number of the received signals and the list of the received signals in the record at steps S32, S33 and S34. To be concrete, the parent base station 19 increments the number of the received signals by one, and adds the packet signal included in the received-signal forwarding message to the list of the received signals. If the record corresponding to the combination of the mobile station ID and the sequence number included in the received-signal forwarding message does not exist in the received-signal management table, the parent base station 19 adds a new record to the received-signal management table at the steps S32, S33 and S34. In other words, the parent base station 19 stores the mobile station ID and the sequence number included in the received-signal forwarding message to the fields corresponding to the mobile station ID and the sequence number in the new record of the received-signal management table. Additionally, the parent base station 19 sets the addition of the waiting period for receiving a signal and a current time to the field corresponding to the deadline for receiving the signal, the value "1" to the field corresponding to the number of the received signals, and the packet signal included in the received-signal forwarding message to the field corresponding to the list of the received signals in the received-signal management table. It should be noted that the above-mentioned waiting period for receiving a signal is a predetermined value.

Figure 34:
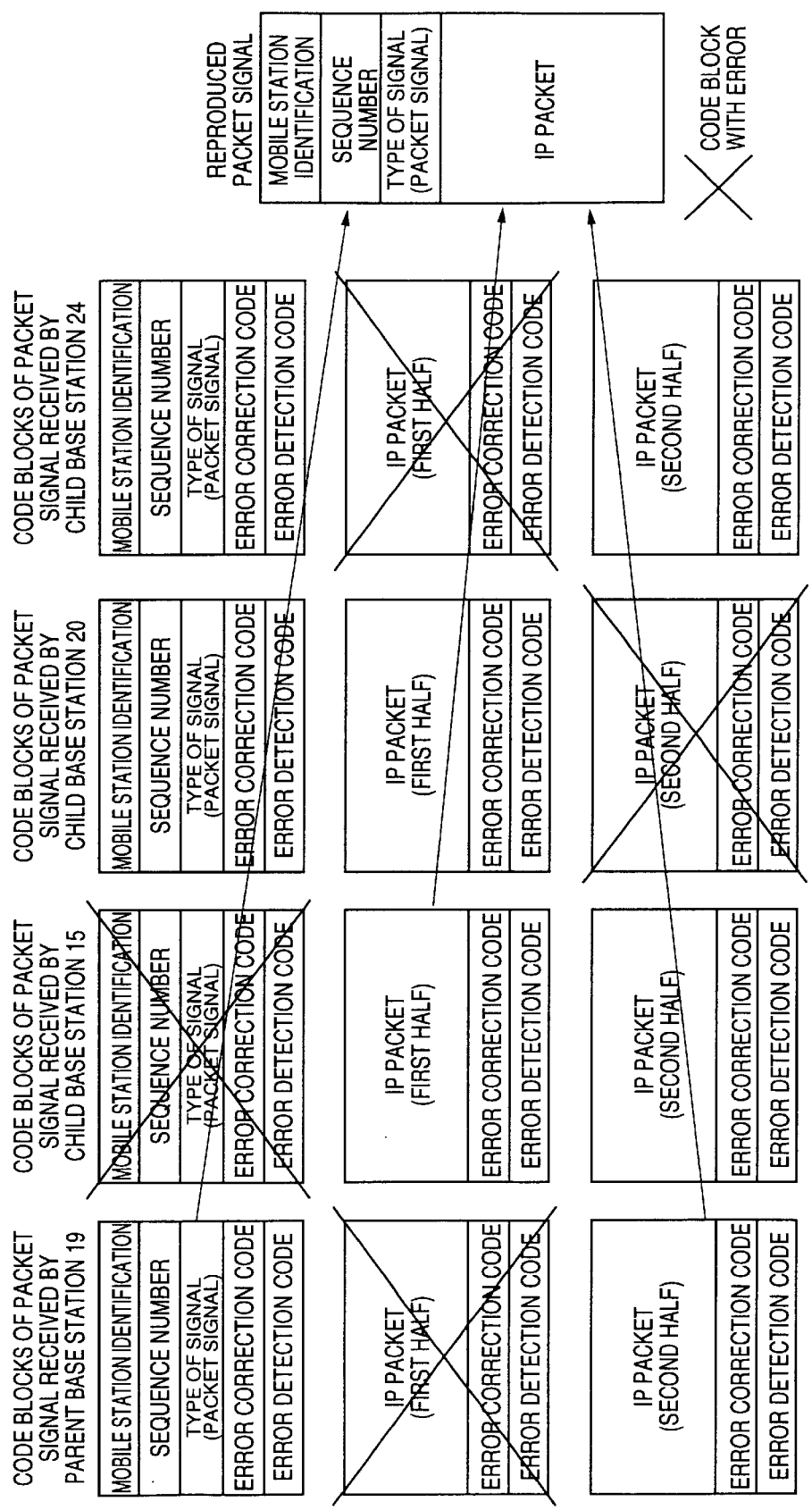
FIG. 34 is a diagram showing a method of combining a plurality of the packet signals.

As described above, the parent base station 19 updates or creates the record in the received-signal management table after receiving the packet signal directly from the mobile station 30 as well as the packet signal forwarded from the child base stations 15, 20 and 24. Subsequently, the parent base station 19 compares the number of the participating child base stations included in the child-base-station management table and the number of the received signals in the record of the received-signal management table corresponding to the combination of the mobile station ID and the sequence number included in the received-signal forwarding message. If the number of the participating child base stations and the number of the received signals are equal, the parent base station 19 combines packet signals stored in the list of the received signals in the record of the received-signal management table corresponding to the combination of the mobile station ID and the sequence number included in the received-signal forwarding message at a step S35. For example, the parent base station 19 searches for code blocks with no error from the packet signal received directly from the mobile station 30 and from each packet signal forwarded by the child base stations 15, 20 and 24, as shown in FIG. 34. If an original packet signal to be transmitted from the mobile station 30 to the stationary terminal station 33 can be reproduced from the code blocks with no error, the parent base station 19 deletes the record including the packet signals, and obtains the IP packet shown in FIGS. 30 and 31 from a reproduced original packet signal. Subsequently, the parent base station 19 transmits the IP packet to the packet communication network 10. If the original packet signal cannot be reproduced, the parent base station 19 deletes the record including the packet signals without transmitting the IP packet.

A virtual base station group organized for each mobile station is cancelled as described below. A parent base station in the virtual base station group constantly checks a period for which child base stations are valid for every record in the child-base-station management table of the parent base station, and deletes a record including the period equal to a current time from the child-base-station management table. Additionally, each child base station in the virtual base station group constantly checks a period for which the parent base station is valid for every record in the parent-base-station management table of the child base station, and deletes a record including the period equal to the current time from the parent-base-station management table. Accordingly, a relation between the parent base station and the child base station is cancelled. In other words, the virtual base station group is cancelled automatically unless a mobile station transmits the request signal for organizing the virtual base station group to the parent base station.

The virtual base station group is reorganized by the following steps. The mobile station sets a period for which the virtual base station group is valid to its internal timer after receiving the response signal for organizing the virtual base station group from the parent base station, and starts the internal timer. When the internal timer counts up to the period, the mobile station retransmits the request signal for organizing the virtual base station group to the parent base station, and reassigns the period to the internal timer. By receiving the request signal from the mobile station, the parent base station transmits the request message for participating the virtual base station group to each child base station. Accordingly, processes for organizing the virtual base station group are performed at the parent base station and each child base station. Consequently, the virtual base station group continues being organized.

Additionally, a mobile station measures a received-signal strength of each radio channel while moving, and selects a base station corresponding to a radio channel whose received-signal strength is higher than the received-signal-strength threshold as a part of a virtual base station group for the mobile station, as shown in FIG. 16. Every time the mobile station selects such a base station as a part of the virtual base station group, the mobile station transmits the request signal for organizing the virtual base station group to a parent base station having the highest received-signal strength among base stations included in the virtual base station group, thereby organizing the virtual base station group, as shown in FIG. 21. Consequently, the received-signal strength of each radio channel changes along with movement of the mobile station, and thus base stations composing the virtual base station group change according to changing received-signal strengths of radio channels. For example, in a case in which the mobile station moves from a position shown in FIG. 35 to a position shown in FIG. 36, base stations composing the virtual base station group for the mobile station change with the movement of the mobile station.

A method of transmitting a packet signal from the mobile station 30 to the stationary terminal station 33, that is, an upward signal, has been described. On the other hand, a method of transmitting a packet signal from the stationary terminal station 33 to the mobile station 30, that is, a downward signal, will be described with reference to FIG. 37. FIG. 37 shows a case in which the virtual base station group for the mobile station 30 includes the base station 19 as the parent base station, and the base stations 15, 20 and 24 as the child base stations. The stationary terminal station 33 a packet signal including the IP address 23 of the stationary terminal station 33 as a source IP address and the IP address 20 of the mobile station 30 as a destination IP address to the packet communication network 10. The packet communication network 10 manages a relation between a mobile station and each of base stations in the mobile communication system 1, and transmits the packet signal received from the stationary terminal station 33 to the base station 19, which is the parent base station of the virtual base station group for the mobile station 30.

After receiving the packet signal from the stationary terminal station 33 through the packet communication network 10, the parent base station 19 transmits the packet signal to the mobile station 30 through a radio channel assigned to the parent base station 19. Additionally, the parent base station 19 copies the packet signal transmitted from the stationary terminal station 33, and forwards a copied packet signal to the child base stations 15, 20 and 24 through the packet communication network 10 in order. Each of the child base stations 15, 20 and 24 receives the copied packet signal from the parent base station 19, confirms that a destination of the copied packet signal is the mobile station 30, and then transmits the copied packet signal to the mobile station 30 through the assigned radio channel.

The mobile station 30 determines whether the packet signal received from each of the base stations 19, 15, 20 and 24 composing the virtual base station group is the packet signal that has been transmitted from the stationary terminal station 33 to the mobile station 30 by checking the source IP address, the destination IP address, the sequence number and the like included in each received packet signal. If the mobile station 30 confirms each received packet signal as the packet signal that has been transmitted from the stationary terminal station 33 to the mobile station 30, the mobile station 30 combines packet signals received from the base stations 19, 15, 20 and 24, by taking the above-described steps as shown in FIG. 34. As a result, the mobile station 30 processes a combined packet signal as the packet signal that has been transmitted from the stationary terminal station 33.

Figure 35:
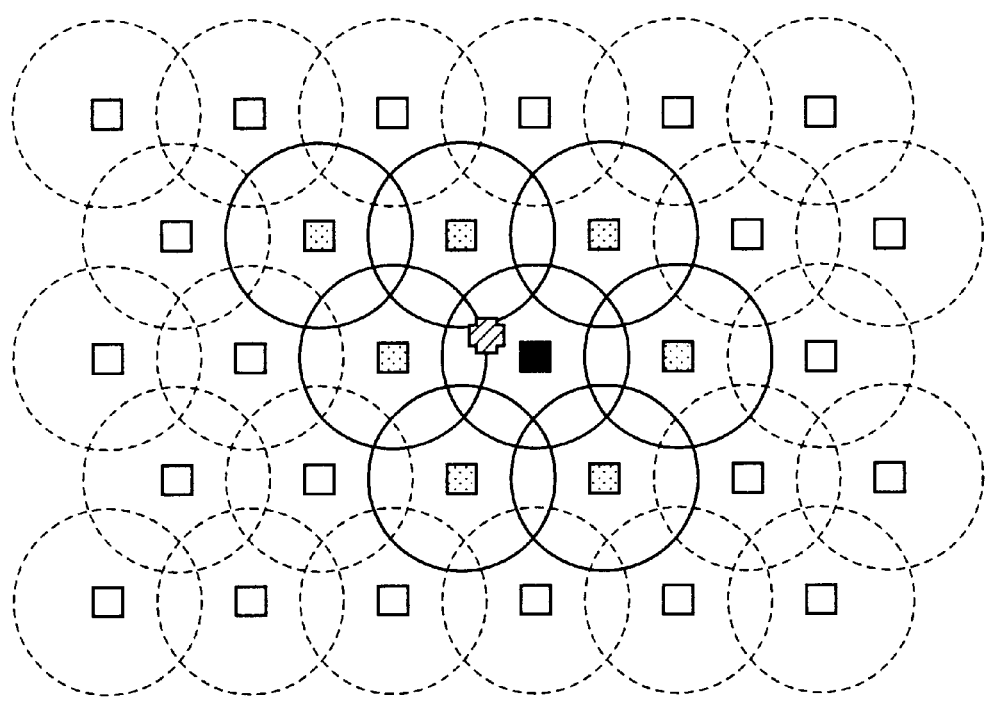
FIG. 35 is a diagram showing the virtual base station group for the mobile station positioned at an initial location.
Figure 36:
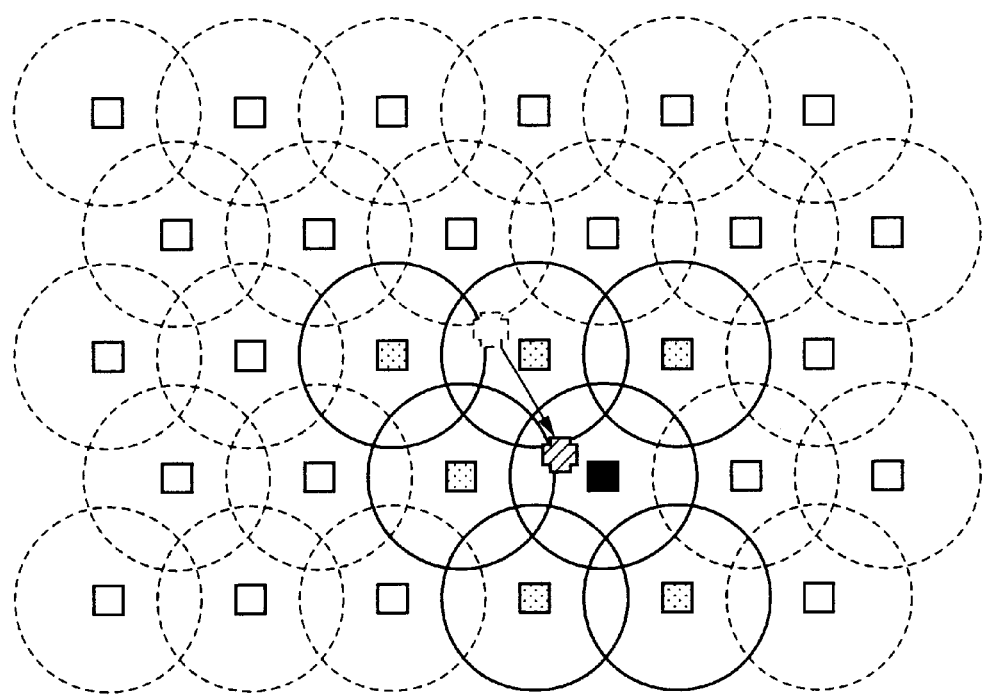
FIG. 36 is a diagram showing a reorganized virtual base station group for the mobile station moved from the initial location.

In the above-described mobile communication system according to the present invention, construction and cancellation of a virtual base station group including a plurality of base stations are repeated changing components of the virtual base station group according to a position of a moving mobile station, as shown in FIGS. 35 and 36. In other words, the plurality of base stations that belong to the virtual base station group change dynamically with movement of the mobile station. In processes of constructing and-canceling the virtual base station group, the plurality of base stations composing the virtual base station group receive a packet signal transmitted from the mobile station simultaneously. Subsequently, a parent base station combines the packet signals received by the base stations. The parent base station then transmits a combined packet signal through a packet communication network to other terminal stations such as a stationary terminal station, other mobile stations in the mobile communication system, and mobile stations in other mobile communication systems. On the other hand, a packet signal whose destination is the mobile station transmitted from other terminal stations is forwarded to the parent base station included in the virtual base station group for the mobile station. Subsequently, the parent base station copies the packet signal, and transmits a copied packet signal to each child base station composing the virtual base station group. Additionally, the parent base station transmits the packet signal to the mobile station. Each child base station transmits the copied packet signal to the mobile station in order. The mobile station receives the packet signals from the parent base station and each child base station, and combines the packet signals to obtain an original packet signal transmitted from the stationary terminal station with no error.

Since the packet signal transmitted from the mobile station is received by the plurality of base stations composing the virtual base station group simultaneously, and is transmitted to a destination terminal station by combining the packet signals received by the base station, an error rate of the packet signal transmitted to the destination terminal station decreases. Additionally, the packet signal whose destination is the mobile station is transmitted from the base stations composing the virtual base station group, an error rate of the packet signal obtained at the mobile station also decreases.

Additionally, processes for achieving communication between the mobile station and the plurality of base stations composing the virtual base station group are performed at the parent base station defined in the virtual base station group, and thus the processes are dispersed to the parent base station in a virtual base station group corresponding to each mobile station even if the number of mobile stations increases in a communication service area. Accordingly, the processes related to the communication between the mobile station and the plurality of base stations are not concentrated in a specific communication node.

Additionally, since the base stations are connected non-hierarchically to each other through the packet communication network, the communication between the mobile station and the plurality of base stations can be steadily maintained. Additionally, in a case of applying the CDMA method to the mobile communication system, the plurality of base stations can receive the packet signal simultaneously through a single radio channel (spreading code). Accordingly, radio channels, as limited resources, are effectively utilized according to the present invention. Additionally, in a case in which any of the base stations connected non-hierarchically to each other through the packet communication network is damaged, the virtual base station group can be organized without a damaged base station. Accordingly, capacity of the mobile communication system for failure in the system increases.

The description has been given of the method of communicating between the mobile station and the stationary terminal station connected to the packet communication network. However, communication between mobile stations in the mobile communication system may also be executed by utilizing the methods of transmitting the upward signal and the downward signal. Additionally, a method of combining packet signals is not limited to the method shown in FIG. 34. For instance, the method of combining packet signals may be a well-known method of combining the packet signals with a maximum ratio by use of soft decision information. Furthermore, in the above-described embodiment, base stations composing the virtual base station group are determined based on the received-signal strength of a radio channel of each base station. However, a method of determining the base stations included in the virtual base station group is not limited to such a method. For example, a base station having a better radio transmission path to a mobile station than others may be selected as a part of the virtual base station group based on information indicating a condition of a radio transmission path between the mobile station and each base station. The condition of the radio transmission path may be a distance between the mobile station and each base station (a length of the radio transmission path), a condition of a signal reflected by obstacles on the radio transmission path, a decaying condition of a radio wave, or interference of the signal by radio waves from other communication nodes. Such condition can be expressed as a received-signal strength of a signal, an error rate of the signal, or a received-signal strength of an interfering radio wave.

The above description is provided in order to enable any person skilled in the art to make and use the invention and sets forth the best mode contemplated by the inventors of carrying out the invention.

The present invention is not limited to the specially disclosed embodiments and variations, and modifications may be made without departing from the scope and spirit of the invention.

The present application is based on Japanese Priority Application No. 11-375795, filed on Dec. 28, 1999, the entire contents of which are hereby incorporated by reference.

What is claimed is:

1. A mobile communication system including a plurality of base stations placed in a communication service area and connected to a packet communication network, wherein a mobile station communicates with a second station through the plurality of base stations and the packet communication network, said mobile communication system comprising:

a first means for determining a virtual base station group as an aggregation of the plurality of base stations communicating with said mobile station based on a condition of a radio transmission path between said mobile station and each base station;

a second means for combining packets received by the plurality of base stations that belong to the virtual base station group at a base station included in said virtual base station group, and means for incrementing and transmitting a sequence number that distinguishes signals including an identical mobile station identification (ID) each time said base station transmits combined packets whose destination is the second station to the packet communication network wherein said packet communication network connects the plurality of base stations non-hierarchically.

2. The mobile communication system as claimed in claim 1, wherein said first means determines the base station whose radio transmission path to said mobile station is in a better condition than a predetermined condition as a component of said virtual base station group.

3. The mobile communication system as claimed in claim 2, wherein the base station whose radio transmission path is in the best condition among the plurality of base stations that belong to said virtual base station group determined by said first means is selected to be a parent base station, wherein said second means combines the information transmitted from said mobile station and then received by the plurality of base stations belonging to said virtual base station group at said parent base station.

4. The mobile communication system as claimed in claim 2, further comprising a third means for measuring a received-signal strength of a radio channel used by each base station as the condition of the radio transmission path at said mobile station, wherein said first means determines the base station whose radio channel's received-signal strength is higher than a predetermined received-signal strength as the part of said virtual base station group.

5. The mobile communication system as claimed in claim 4, wherein the base station whose radio channel's received-signal strength is the highest among the plurality of base stations belonging to said virtual base station group is selected as a parent base station, wherein said second means combines the packets transmitted from said mobile station and then received by the plurality of base stations belonging to said virtual base station group at said parent base station.

6. The mobile communication system as claimed in claim 1, wherein the plurality of base stations belonging to said virtual base station group communicate with said mobile station through identical radio channels.

7. The mobile communication system as claimed in claim 1, further comprising a fourth means for canceling a relation of each base station being the part of said virtual base station group after a fixed period.

8. The mobile communication system as claimed in claim 7 wherein said fourth means comprising:

a first management means executed by a base station belonging to said virtual base station group for managing other base stations in said virtual base station group;

a second management means executed by each of said other base stations for managing said base station, wherein said mobile communication system cancels the relation of each base station being the part of said virtual base station group by terminating management of the plurality of base stations belonging to said virtual base station group by use of said first management means and said second management means when the fixed period passes after determination of said virtual base station group.

9. The mobile communication system as claimed in claim 1, further comprising a fifth means for copying original packets transmitted from the second station to said mobile station at the base station included in the virtual base station group, and forwarding copied packets from said base station to other base stations included in said virtual base station group through the packet communication network when said base station receives the original packets, wherein said base station and said other base stations respectively transmit the original packets and the copied packets to said mobile station.

10. A method of controlling a mobile communication system including a plurality of base stations placed in a communication service area and connected to a packet communication network, wherein a mobile station communicates with a second station through the plurality of base stations and the packet communication network, said method comprising the steps of:

connecting the plurality of base stations non-hierarchically to the packet communication network;

determining a virtual base station group as an aggregation of the plurality of base stations communicating with said mobile station based on a condition of a radio transmission path between said mobile station and each base station;

combining information received by the plurality of base stations that belong to the virtual base station group at a base station included in said virtual base station group into combined packets; and incrementing and transmitting a sequence number that distinguishes signals including an identical mobile station identification (ID) each time said base station transmits combined packets whose destination is the second station from said base station to said packet communication network.

11. The method as claimed in claim 10, further comprising the steps of:

copying original packets transmitted from the second station to said mobile station at the base station included in the virtual base station group when said base station receives the original packets;

forwarding copied packets from said base station to other base stations included in said virtual base station group through the packet communication network; and transmitting the original packets from said base station and the copied packets from said other base stations to said mobile station.

* * * * *